(12) United States Patent
Yano et al.

(10) Patent No.: US 10,981,940 B2
(45) Date of Patent: Apr. 20, 2021

(54) TRITYL PROTECTING AGENT

(71) Applicant: SEKISUI MEDICAL CO., LTD., Chuo-ku (JP)

(72) Inventors: Shinya Yano, Chuo-ku (JP); Hideki Kubota, Chuo-ku (JP)

(73) Assignee: SEKISUI MEDICAL CO., LTD., Chuo-ku (JP)

( * ) Notice: Subject to any disclaimer, the term of this patent is extended or adjusted under 35 U.S.C. 154(b) by 4 days.

(21) Appl. No.: 16/347,415

(22) PCT Filed: Nov. 10, 2017

(86) PCT No.: PCT/JP2017/040598
§ 371 (c)(1),
(2) Date: May 3, 2019

(87) PCT Pub. No.: WO2018/088527
PCT Pub. Date: May 17, 2018

(65) Prior Publication Data
US 2019/0308997 A1    Oct. 10, 2019

(30) Foreign Application Priority Data

Nov. 11, 2016 (JP) .............................. JP2016-220173
Sep. 27, 2017 (JP) .............................. JP2017-185936

(51) Int. Cl.
C07F 7/18        (2006.01)

(52) U.S. Cl.
CPC .................. C07F 7/18 (2013.01); *Y02P 20/55* (2015.11)

(58) Field of Classification Search
None
See application file for complete search history.

(56) References Cited

U.S. PATENT DOCUMENTS 5,874,532 A      2/1999   Pieken et al.
6,001,966 A  *  12/1999   Pieken ................. B01J 19/0046
                                                     530/300

(Continued)

FOREIGN PATENT DOCUMENTS

JP   2000-500740 A    1/2000
JP   2001-520660 A   10/2001

(Continued)

OTHER PUBLICATIONS

Greene & Wuts NPL 1999; Protecting Groups in Organic Synthesis, 3rd Ed. Ch. 2. (Year: 1999).*

(Continued)

*Primary Examiner* — Clinton A Brooks
(74) *Attorney, Agent, or Firm* — Oblon, McClelland, Maier & Neustadt, L.L.P.

(57) ABSTRACT

The invention is to develop a protecting group that does not solidify or insolubilize a compound in which a functional group has been protected, and facilitates separation and purification after a reaction. Disclosed is a trityl compound represented by General Formula (1):

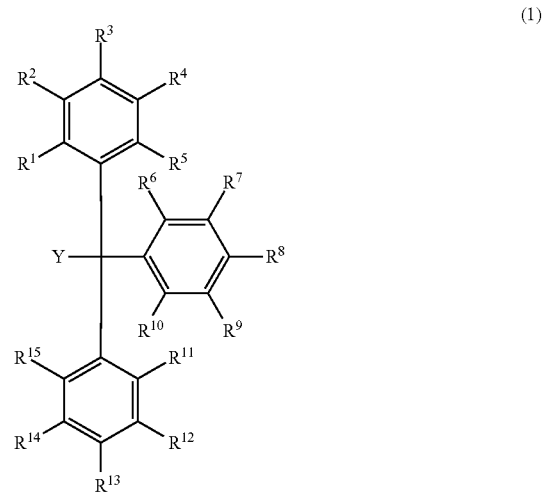

wherein Y represents a hydroxy group or a halogen atom; at least one of $R^1$ to $R^{15}$ represents a group represented by Formula (2):

$$—O—R^{16}—X-A \qquad (2)$$

while the other groups each represent a hydrogen atom, a halogen atom, an alkyl group having 1 to 4 carbon atoms, or an alkoxy group having 1 to 4 carbon atoms;

$R^{16}$ represents a linear or branched alkylene group having 1 to 16 carbon atoms;

X represents O or $CONR^{17}$ (here, $R^{17}$ represents a hydrogen atom or an alkyl group having 1 to 4 carbon atoms); and A represents a group represented by, for example, Formula (3):

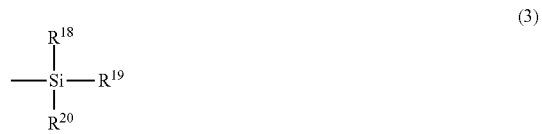

wherein $R^{18}$, $R^{19}$, and $R^{20}$, which may be identical or different, each represent a linear or branched alkyl group having 1 to 6 carbon atoms, or an aryl group which may have a substituent.

20 Claims, No Drawings

(56) References Cited

U.S. PATENT DOCUMENTS

| | | |
|---|---|---|
| 6,262,251 B1 | 7/2001 | Pieken et al. |
| 6,737,236 B1 | 5/2004 | Pieken et al. |
| 2003/0215801 A1 | 11/2003 | Pieken et al. |
| 2004/0116685 A1 | 6/2004 | Pieken et al. |
| 2005/0048496 A1 | 3/2005 | Dellinger et al. |
| 2005/0186579 A1 | 8/2005 | Dellinger et al. |
| 2009/0299103 A1 | 12/2009 | Chiba et al. |
| 2010/0240867 A1 | 9/2010 | Takahashi |
| 2012/0059149 A1 | 3/2012 | Takahashi |
| 2012/0108788 A1 | 5/2012 | Chiba et al. |
| 2014/0005359 A1 | 1/2014 | Takahashi |
| 2014/0046022 A1 | 2/2014 | Takahashi |
| 2017/0008922 A1 | 1/2017 | Takahashi |

FOREIGN PATENT DOCUMENTS

| | | |
|---|---|---|
| JP | 2002-511840 A | 4/2002 |
| JP | 5113118 B2 | 1/2013 |
| JP | 5929756 B2 | 6/2016 |
| WO | WO 98/47910 A1 | 10/1998 |
| WO | WO 2010/104169 A1 | 9/2010 |

OTHER PUBLICATIONS

Extended European Search Report dated Apr. 6, 2020 in European Patent Application No. 17869333.9, 7 pages.
International Search Report dated Dec. 12, 2017 in PCT/JP2017/040598 filed Nov. 10, 2017.

\* cited by examiner

TRITYL PROTECTING AGENT

FIELD OF THE INVENTION

The present invention relates to a novel trityl compound that is useful as a protecting agent for, for example, a carboxy group, a hydroxy group, an amino group, an amide group, and a mercapto group.

BACKGROUND OF THE INVENTION

In regard to the synthesis of peptides or the synthesis of various compounds, there are occasions in which a reaction needs to be performed after protecting a functional group such as a carboxy group, a hydroxy group, an amino group, an amide group, or a mercapto group. Regarding such a protecting group, a group that is capable of protection by a simple and convenient method and can be removed under mild conditions, is desirable. For example, as a protecting group for a carboxy group, a benzyl ester (Bn) and a tert-butyl ester are known. Furthermore, it has been recently reported that a benzyl alcohol compounds, a trityl compounds, and a fluorine compounds are useful as protecting groups (Patent Literatures 1, 2, and 3).

CITATION LIST

Patent Literature

Patent Literature 1: JP 5929756 B2
Patent Literature 2: JP 5113118 B2
Patent Literature 3: WO 2010/104169 A

SUMMARY OF THE INVENTION

Problem to be Solved by the Invention

However, compounds having their functional groups protected by conventional protecting groups have a defect that the compounds are easily precipitated out. Particularly, in regard to peptide synthesis, since the compounds become insoluble even in organic solvents, separation and purification of compounds after reaction have been often difficult. This difficulty in separation and purification has been a serious problem in the peptide synthesis, in which condensation reactions are sequentially performed.

Therefore, an object of the present invention is to provide a protecting group that enables a compound having a protected functional group to dissolve in an organic solvent without solidifying or insolubilizing and thereby facilitates separation and purification after a reaction.

Mean for Solving the Problem

Thus, the inventors of the present invention conducted various investigations on substituents of trityl compounds, and as a result, the inventors developed a trityl compound having a substituted silyloxy group at an end through an oxyalkylene group on a benzene ring. The inventors found that this trityl compound is useful as a protecting agent of a heteroatom, and an organic compound, such as a peptide, having a functional group protected using this trityl compound has a feature that the organic compound is not easily precipitated out in an organic solvent, and separation and purification is facilitated by an operation of liquid-liquid phase separation. Thus, the inventors completed the present invention.

That is, the present invention provides the following [1] to [8].

[1] A trityl compound represented by General Formula (1):

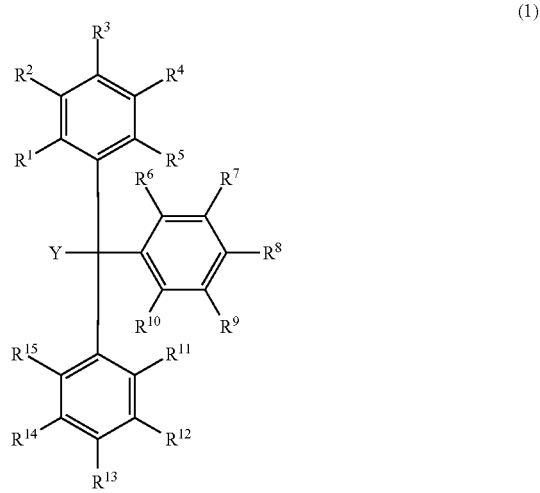

(1)

wherein Y represents a hydroxy group or a halogen atom; at least one of $R^1$ to $R^{15}$ represents a group represented by Formula (2):

$$-O-R^{16}-X-A \quad (2)$$

while the other groups each represent a hydrogen atom, a halogen atom, an alkyl group having 1 to 4 carbon atoms, or an alkoxy group having 1 to 4 carbon atoms;

$R^{16}$ represents a linear or branched alkylene group having 1 to 16 carbon atoms;

X represents O or $CONR^{17}$ (here, $R^{17}$ represents a hydrogen atom or an alkyl group having 1 to 4 carbon atoms);

A represents a group represented by Formula (3), (4), (5), (6), (7), (8), (9), (10), (11), (12), or (13):

(3)

(4)

(5)

-continued (6)
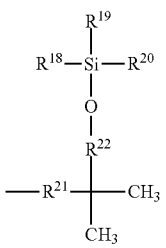

(7)
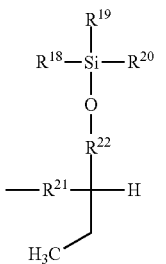

(8)
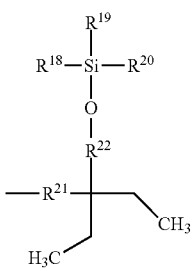

(9)
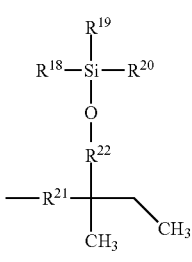

(10)
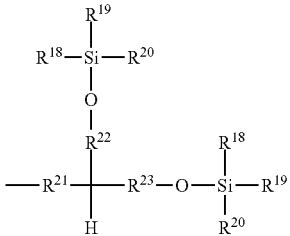

(11)
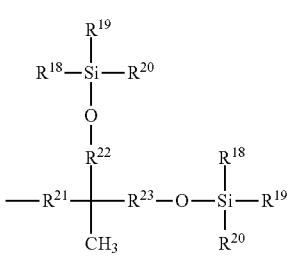

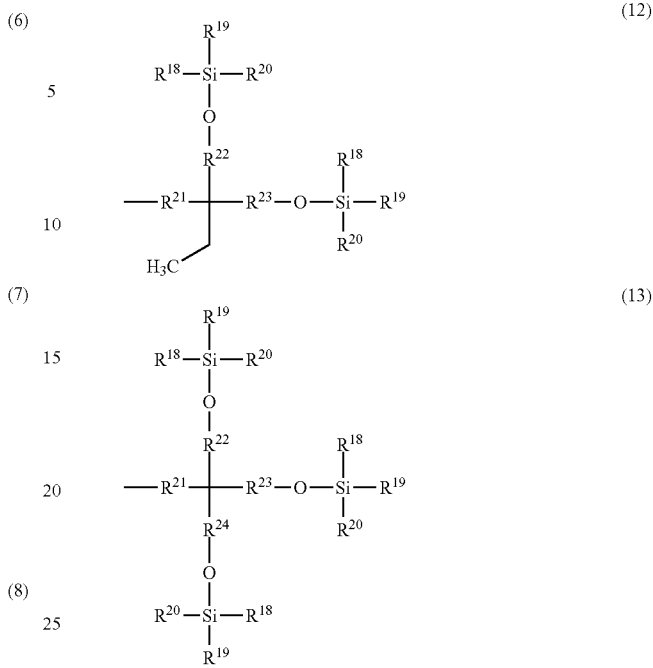

wherein $R^{18}$, $R^{19}$, and $R^{20}$, which may be identical or different, each represent a linear or branched alkyl group having 1 to 6 carbon atoms or an aryl group which may have a substituent; $R^{21}$ represents a single bond or a linear or branched alkylene group having 1 to 3 carbon atoms; and $R^{22}$, $R^{23}$, and $R^{24}$ each represent a linear or branched alkylene group having 1 to 3 carbon atoms.

[2] The trityl compound according to [1], in which Y represents a hydroxy group, a chlorine atom, or a bromine atom.

[3] The trityl compound according to [1] or [2], in which at least one of $R^1$ to $R^{15}$ represents a group represented by Formula (2), and the other groups each represent a hydrogen atom or a halogen atom.

[4] The trityl compound according to any one of [1] to [3], in which $R^{16}$ represents a linear or branched alkylene group having 2 to 16 carbon atoms.

[5] The trityl compound according to any one of [1] to [4], in which the case of the group represented by Formula (2) being a 2-t-butyldimethylsilyloxyethoxy group or a 3-t-butyldimethylsilyloxypropoxy group is excluded.

[6] The trityl compound according to any one of [1] to [5], in which $R^{16}$ represents a linear or branched alkylene group having 6 to 16 carbon atoms.

[7] The trityl compound according to any one of [1] to [6], in which $R^{21}$ represents a single bond or a methylene group, and $R^{22}$, $R^{23}$, and $R^{24}$ each represent a methylene group.

[8] A protecting agent for a carboxy group, a hydroxy group, an amino group, an amide group, or a mercapto group, the protecting agent including the trityl compound according to any one of [1] to [7].

Effects of Invention

Since a compound having a functional group protected using the trityl compound (1) of the present invention is easily to be liquid and has increased solubility in a solvent, separation and purification after a condensation reaction are easily performed.

In the production processes for various chemical substances such as medicines and agrochemicals, in a case in which insolubilization and solidification of raw materials or intermediates have become hindrance, when the trityl compound (1) of the present invention is bonded to a raw material compound or an intermediate compound, liquidity and solubility of these substances are enhanced, and thus these problems can be solved.

DESCRIPTION OF EMBODIMENTS

The trityl compound of the present invention represented by General Formula (1) has a feature that at least one of $R^1$ to $R^{15}$ has a structure of Formula (2). By having such a structure, a compound protected using this trityl compound (1) is easily to become liquid, and solubility in a solvent is markedly increased.

In General Formula (1), Y represents a hydroxy group or a halogen atom. Here, examples of the halogen atom include a chlorine atom, a bromine atom, an iodine atom, and a fluorine atom.

Y is preferably a hydroxy group, a chlorine atom, or a bromine atom.

In the trityl compound of the present invention, at least one among $R^1$ to $R^{15}$ represents a group represented by Formula (2); however, it is preferable that one or two among these are groups represented by Formula (2), from the viewpoints of the solubility of the protecting group-introduced compound and the removability of the protecting group.

The remaining groups are each a hydrogen atom, a halogen atom, an alkyl group having 1 to 4 carbon atoms, or an alkoxy group having 1 to 4 carbon atoms. Here, examples of the halogen atom represented by $R^1$ to $R^{15}$ of the remaining groups include a fluorine atom, a chlorine atom, a bromine atom, and an iodine atom, and among these, a chlorine atom and a fluorine atom are preferred. Furthermore, the position of substitution is preferably the ortho-position. Examples of the alkoxy group having 1 to 4 carbon atoms of the remaining groups include a methoxy group, an ethoxy group, an n-propyloxy group, an isopropyloxy group, and an n-butyloxy group, and among these, a methoxy group is preferred. Furthermore, examples of the alkyl group having 1 to 4 carbon atoms include a methyl group, an ethyl group, an n-propyl group, an isopropyl group, and an n-butyl group, and among these, a methyl group and an ethyl group are more preferred.

$R^{16}$ represents a linear or branched alkylene group having 1 to 16 carbon atoms. Among the relevant alkylene groups, a linear or branched alkylene group having 2 or more to 16 or less carbon atoms is preferred, a linear or branched alkylene group having 6 or more to 16 or less carbon atoms is more preferred, a linear or branched alkylene group having 8 or more to 14 or less carbon atoms is even more preferred, and a linear or branched alkylene group having 8 to 12 carbon atoms is still more preferred. Specific examples of the alkylene group include a methylene group, an ethylene group, a trimethylene group, a tetramethylene group, a pentamethylene group, a hexamethylene group, a heptamethylene group, an octamethylene group, a nanomethylene group, a decamethylene group, an undecamethylene group, a dodecamethylene group, and a tetradecamethylene group.

X represents O or $CONR^{17}$.

Here, $R^{17}$ represents a hydrogen atom or an alkyl group having 1 to 4 carbon atoms, and a hydrogen atom is preferred.

A represents a group represented by Formula (3), (4), (5), (6), (7), (8), (9), (10), (11), (12), or (13). $R^{18}$, $R^{19}$, and $R^{20}$, which may be identical or different, each represent a linear or branched alkyl group having 1 to 6 carbon atoms, or an aryl group, which may have a substituent. Here, examples of the alkyl group having 1 to 6 carbon atoms include a methyl group, an ethyl group, an n-propyl group, an isopropyl group, an n-butyl group, an isobutyl group, a sec-butyl group, a tert-butyl group, an n-pentyl group, and an n-hexyl group. Among these, an alkyl group having 1 to 4 carbon atoms is more preferred, and a methyl group, tert-butyl, and an isopropyl group are even more preferred.

Examples of the aryl group, which may have a substituent include an aryl group having 6 to 10 carbon atoms, and specific examples include a phenyl group and a naphthyl group, both of which may be substituted with an alkyl group having 1 to 3 carbon atoms. Among these, a phenyl group is more preferred.

$R^{21}$ represents a single bond or a linear or branched alkylene group having 1 to 3 carbon atoms. Examples of the linear or branched alkylene group having 1 to 3 carbon atoms include a methylene group, an ethylene group, a trimethylene group, and a propylene group; however, among these, a single bond is particularly preferred.

$R^{22}$, $R^{23}$, and $R^{24}$ each represent a linear or branched alkylene group having 1 to 3 carbon atoms. Examples of the linear or branched alkylene group having 1 to 3 carbon atoms include a methylene group, an ethylene group, a trimethylene group, and a propylene group; however, a methylene group is particularly preferred.

In regard to General Formula (1), a compound in which Y represents a hydroxy group, a chlorine atom, or a bromine atom; at least one, and preferably one or two, among $R^1$ to $R^{15}$ each represent a group represented by Formula (2), while the remaining groups are each a hydrogen atom, a chlorine atom, or a fluorine atom; $R^{16}$ represents a linear or branched alkylene group having 2 to 16 carbon atoms; $R^{21}$ represents a single bond or a methylene group; and $R^{22}$, $R^{23}$, and $R^{24}$ each represent a methylene group, is more preferred.

Furthermore, in regard to General Formula (2), a compound in which $R^{16}$ represents a linear or branched alkyl group having 6 to 16 carbon atoms; X represents O or CONH; A represents a group represented by Formula (3) or Formula (13); $R^{18}$, $R^{19}$, and $R^{20}$, which may be identical or different, each represent an alkyl group having 1 to 4 carbon atoms; $R^{21}$ represents a single bond; and $R^{22}$, $R^{23}$, and $R^{24}$ each represent a methylene group, is more preferred.

Here, a specific preferred example of a state in which the group represented by Formula (2) is bonded is shown below. Regarding the group represented by Formula (2), it is preferable that a 2-t-butyldimethylsilyloxyethoxy group or a 3-t-butyldimethylsilyloxypropoxy group is excluded.

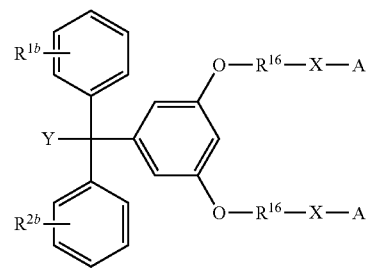

(1-1)

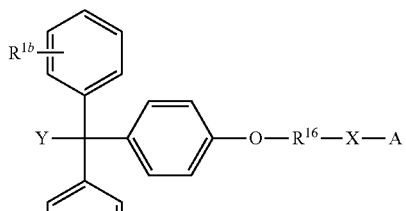

(1-2)

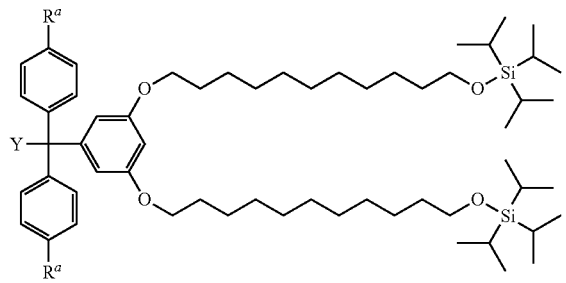

(b) TIPS2 Type-(MM)-PP Protecting Agent (1-3)

wherein $R^a$ represents a hydrogen atom or a halogen atom.

(c) TIPS2 Type-(M)(M)-O Protecting Agent

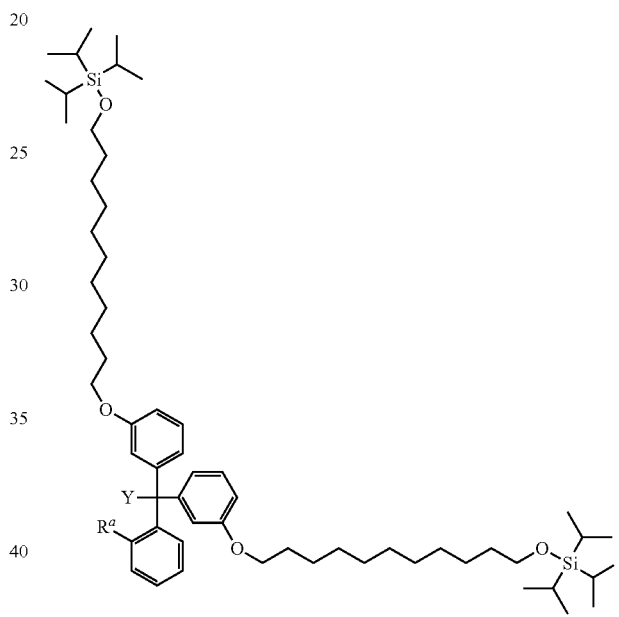

(1-4)

wherein $R^{1b}$ and $R^{2b}$ each represent a hydrogen atom or a halogen atom; and Y, A, X, and $R^{16}$ are the same as described above.

Specific examples of the trityl compound (1) of the present invention include the following (a) to (e). In (a) to (e), Y represents a hydroxy group or a halogen atom.

(a) TIPS2 Type-(MM)-OO Protecting Agent

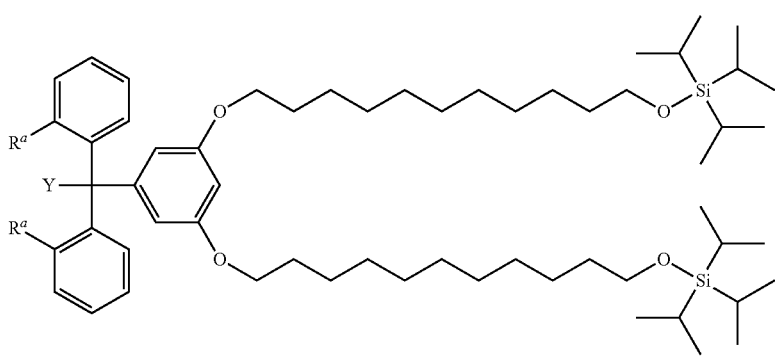

wherein $R^a$ represents a hydrogen atom or a halogen atom.

wherein $R^a$ represents a hydrogen atom or a halogen atom.

(d) TIPS3 Type-(P)-OO Protecting Agent
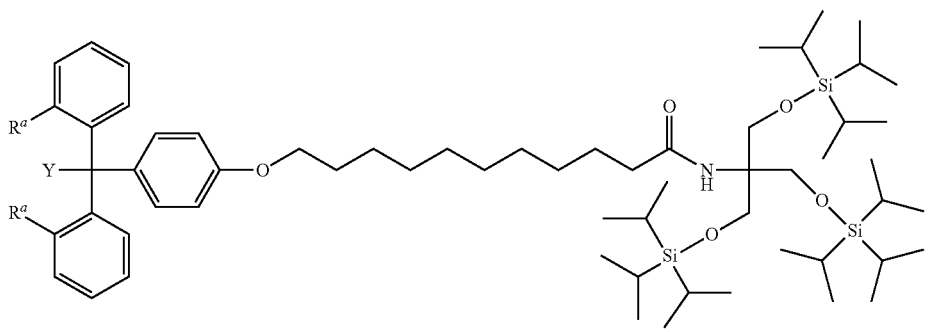
wherein $R^a$ represents a hydrogen atom or a halogen atom.
(e) TIPS4 Type-(MM)(MM)-O Protecting Agent
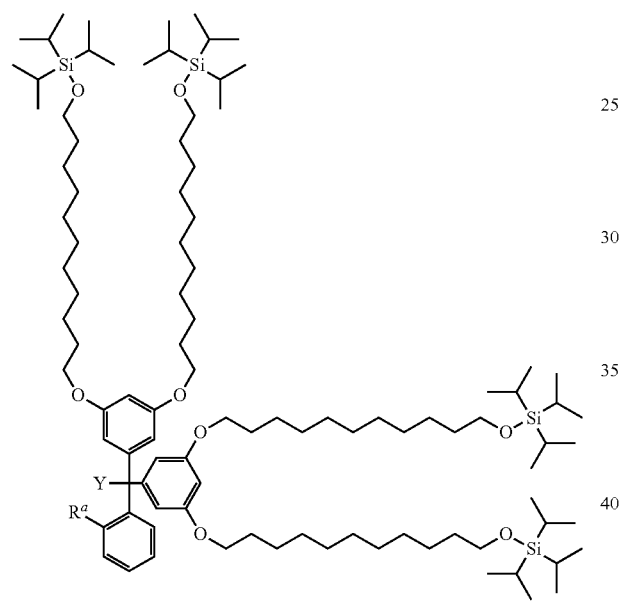
wherein $R^a$ represents a hydrogen atom or a halogen atom.
The trityl compound (1) of the present invention can be produced by, for example, the reaction schemes shown below.
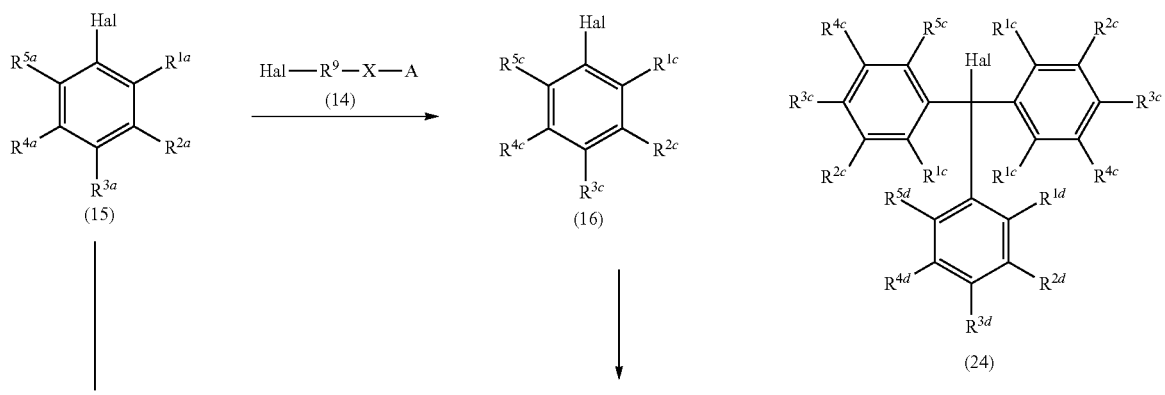

-continued
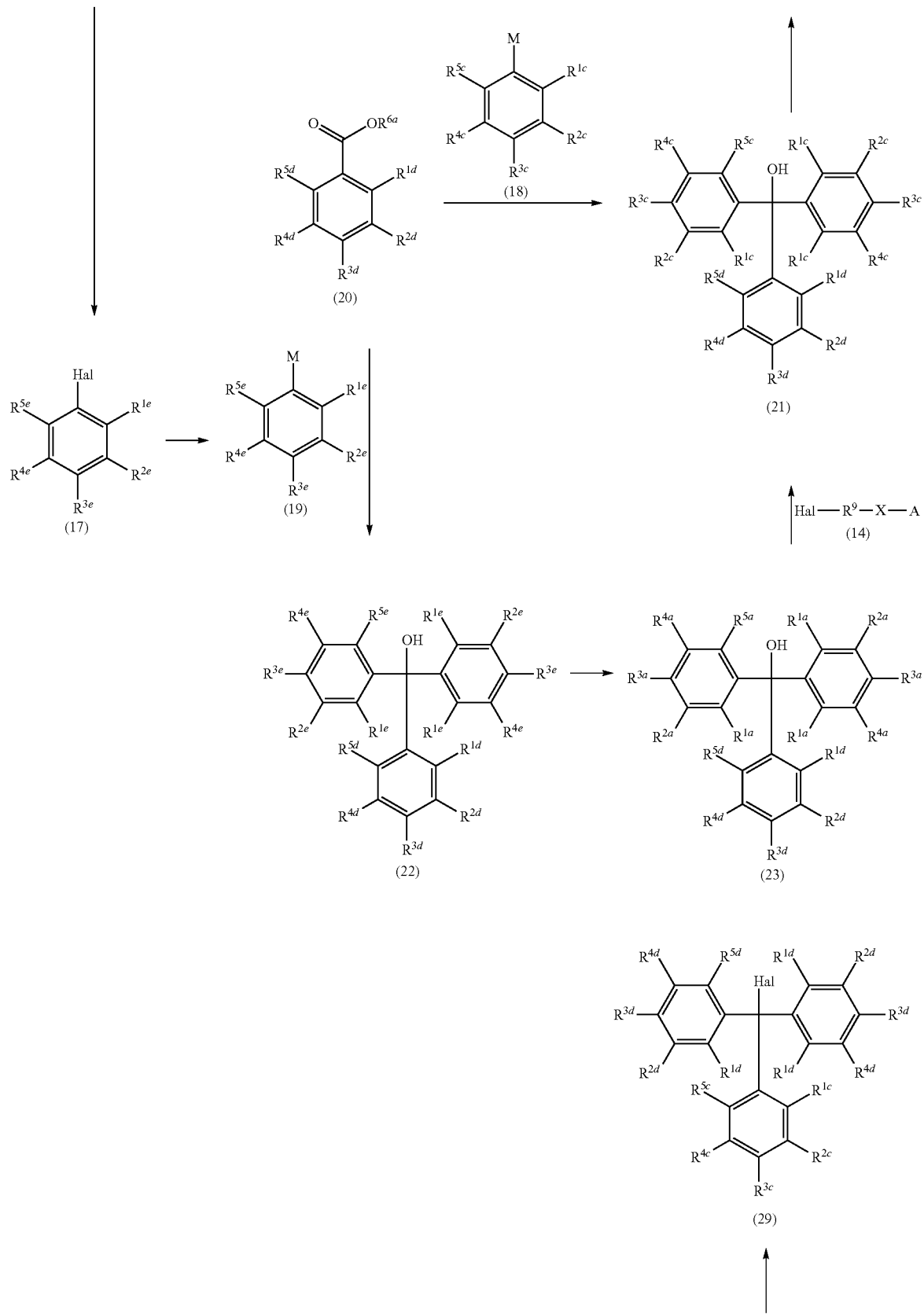

-continued
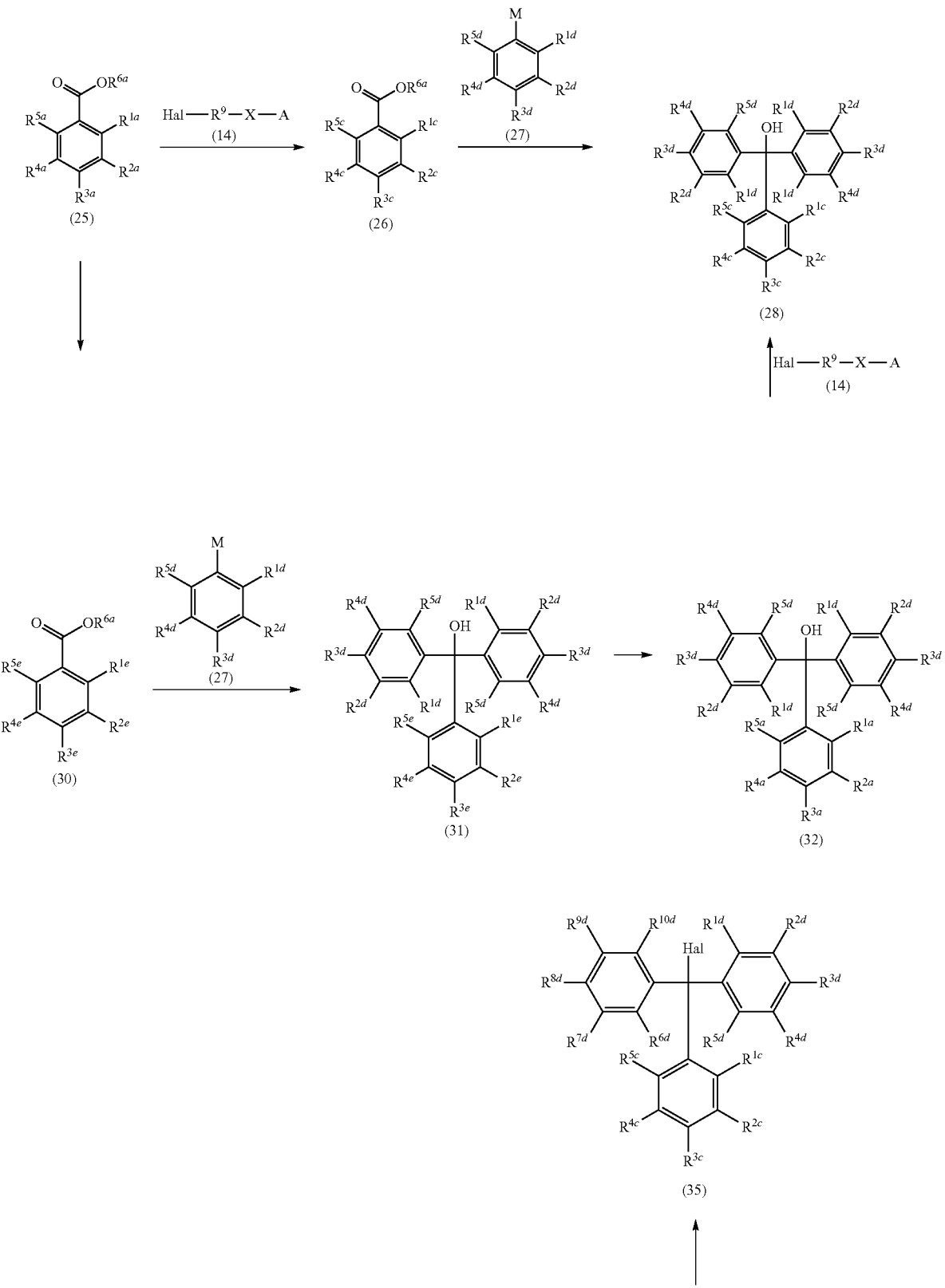

-continued
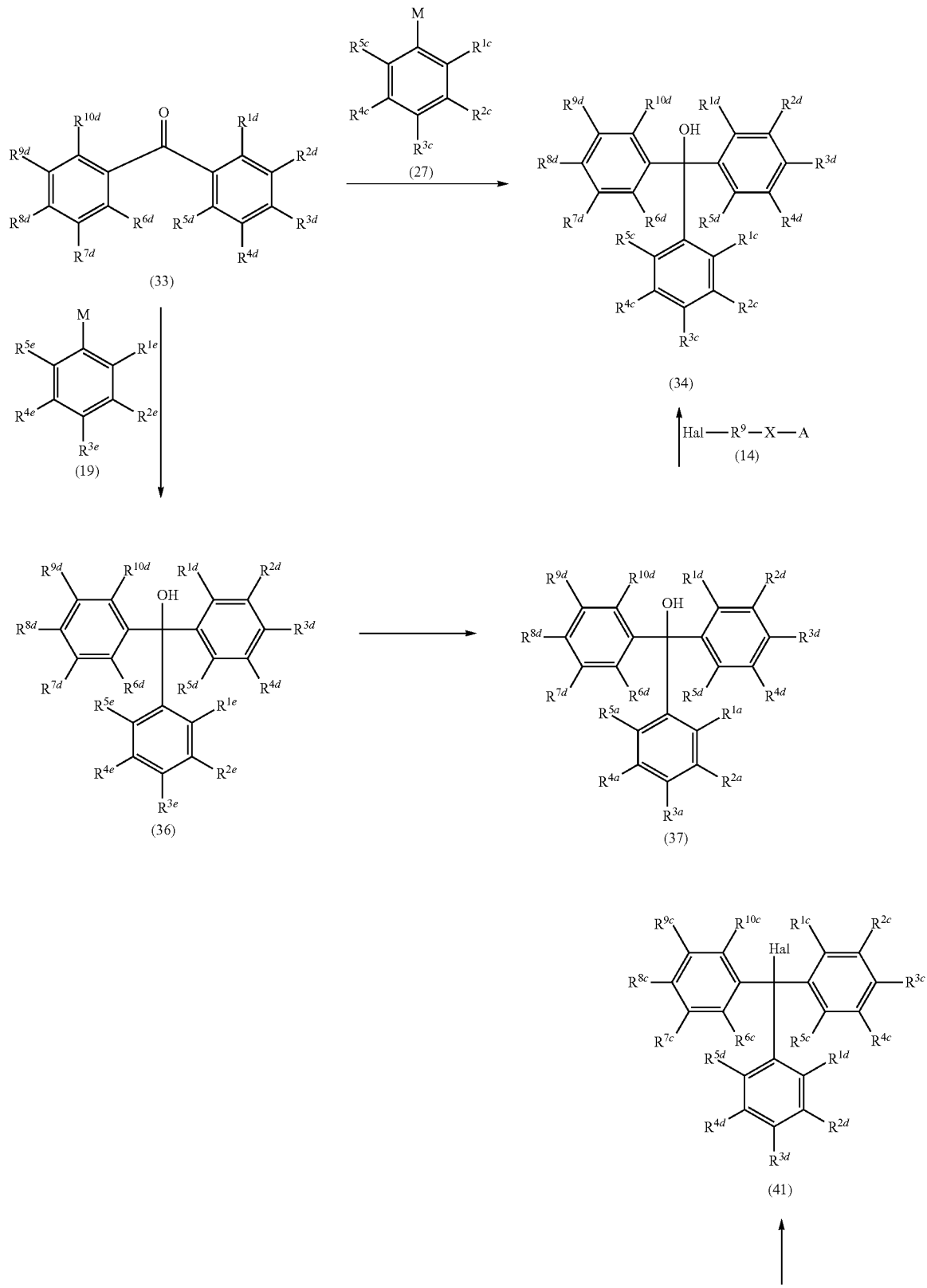

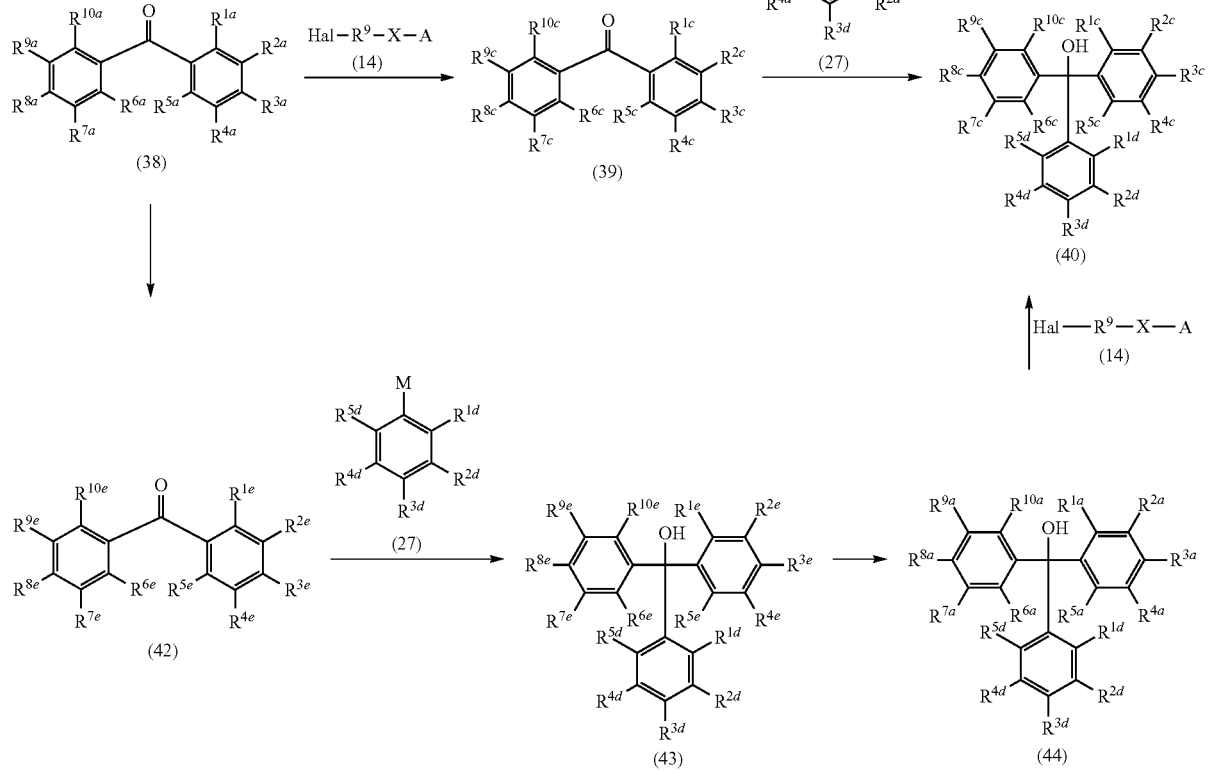

wherein Hal represents a halogen atom; at least one of $R^{1a}$ to $R^{10a}$ represents a hydroxy group, while the remaining groups each represent a hydrogen atom, an alkyl group having 1 to 4 carbon atoms, or an alkoxy group having 1 to 4 carbon atoms; $R^{6a}$ represents an alkyl group having 1 to 3 carbon atoms; at least one of $R^{1c}$ to $R^{10c}$ represents a group represented by Formula (2), while the remaining groups each represent a hydrogen atom, a halogen atom, an alkyl group having 1 to 4 carbon atoms, or an alkoxy group having 1 to 4 carbon atoms; $R^{1d}$ to $R^{10d}$ each represent a hydrogen atom, a halogen atom, an alkyl group having 1 to 4 carbon atoms, or an alkoxy group having 1 to 4 carbon atoms; at least one of $R^{1e}$ to $R^{10e}$ represents —OTBS, —OTIPS, or —OTBDPS, while the remaining groups each represent a hydrogen atom, a halogen atom, an alkyl group having 1 to 4 carbon atoms, or an alkoxy group having 1 to 4 carbon atoms; and M represents MgBr or Li.

A silyloxylated alkyl halide (14) is reacted with halogenated aryl compound (15), thereby a silyloxylated aryl compound (16) is obtained, subsequently this compound is reacted with a metallic reagent, and thus an organometallic reagent (18) is obtained. The organometallic reagent (18) is reacted with an ester compound (20), and thus a trityl compound (21) having a hydroxy group is obtained. Furthermore, this is halogenated, and thereby a compound of Formula (24) is obtained. Alternatively, a hydroxy group of the halogenated aryl compound (15) is protected with a silyl ether, subsequently, the halogenated aryl compound is reacted with a metallic reagent to obtain an organometallic reagent (19), the organometallic reagent is reacted with an ester compound (20), and thus a compound of Formula (22) is obtained. Subsequently, the protecting group of the compound of Formula (22) is removed to obtain a compound of Formula (23), this compound is reacted with a silyloxylated alkyl halide (14), and thus a compound of Formula (21) can also be obtained.

A silyloxylated alkyl halide (14) is reacted with an ester compound (25), thereby a silyloxylated ester compound (26) is obtained, subsequently this compound is reacted with an organometallic reagent (27), and thus a compound of a trityl compound (28) having a hydroxy group is obtained. Furthermore, this is halogenated, and thereby a compound of Formula (29) is obtained. Also, a hydroxy group of an ester compound (25) is protected with a silyl ether, subsequently the ester compound is reacted with an organometallic reagent (27), and thus a compound of Formula (31) is obtained. Subsequently, the protecting group of the compound of Formula (31) is removed to obtain a compound of Formula (32), this compound is reacted with a silyloxylated alkyl halide (14), and thus a compound of Formula (28) is obtained.

A ketone compound (33) is reacted with an organometallic reagent (18), thereby a compound of Formula (34) is obtained, the trityl compound (34) having a hydroxy group is halogenated, and thereby a compound of Formula (35) is obtained. Alternatively, a ketone compound (33) is reacted with an organometallic reagent (19) to obtain a compound of Formula (36), subsequently, a protecting group of the compound of Formula (36) is removed to obtain a compound of Formula (37), this compound is reacted with a silyloxylated alkyl halide (14), and thus a compound of Formula (34) can also be obtained.

A ketone compound (38) is reacted with a silyloxylated alkyl halide (14), thereby a silyloxylated ketone compound (39) is obtained, subsequently this compound is reacted with an organometallic reagent (27), and thus a compound of a trityl compound (40) having a hydroxy group is obtained. Furthermore, this is halogenated, and thereby a compound of Formula (41) is obtained. Alternatively, a hydroxy group of a ketone compound (38) is protected with a silyl ether, subsequently the ketone compound is reacted with an organometallic reagent (27), and thus a compound of Formula (43) is obtained. Subsequently, the protecting group of the compound of Formula (43) is removed to obtain a compound of Formula (44), this compound is reacted with a silyloxylated alkyl halide (14), and thus a compound of Formula (40) can also be obtained.

A silyloxylated alkyl halide (14), which is a raw material, can be produced by, for example, reacting a halogenated alcohol with a silylating agent in the presence of a base. The halogen atom in the compound (14) may be, for example, a bromine atom.

Furthermore, regarding the reactions for obtaining a compound of Formula (17) from a compound of Formula (15), a compound of Formula (30) from a compound of Formula (25), and a compound of Formula (42) from a compound of Formula (38), each of the compounds can be produced by reacting an alcohol with a silylating agent in the presence of a base, as described above.

Examples of the silylating agent that is used for the above-described reactions include triisopropylsilyl chloride (TIPSCl), triisopropylsilylbromide, triisopropylsilyliodide, methanesulfonyltriisopropylsilyl, trifluoromethanesulfonylisopropylsilyl, p-toluenesulfonyltriisopropylsilyl, tert-butyldiphenylchlorosilane (TBDPSCl), and tert-butyldimethylchlorosilane (TBSCl).

Examples of the base include organic bases such as TEA, DIPEA, DBU, diazabicyclononene (DBN), DABCO, imidazole, N-methylimidazole, N,N-dimethylaniline, pyridine, 2,6-rutidine, DMAP, LDA, NaOAc, MeONa, MeOK, lithium hexamethyldisilazide (LHMDS), and sodium bis(trimethylsilyl)amide (NaHMDS); and inorganic bases such as $Na_2CO_3$, $NaHCO_3$, NaH, $NaNH_2$, $K_2CO_3$, and $Cs_2CO_3$.

Examples of the solvent include hydrocarbons such as hexane and heptane; ethers such as diethyl ether, diisopropyl ether, cyclopentyl methyl ether (CPME), tetrahydrofuran, and dioxane; nitriles such as acetonitrile; amides such as dimethylformamide (DMF), dimethylacetamide, and hexamethylphosphoramide; sulfoxides such as dimethyl sulfoxide; lactams such as N-methylpyrrolidone; halogenated hydrocarbons such as chloroform and dichloromethane; aromatic hydrocarbons such as toluene and xylene; and mixed solvents of these.

The reaction may be performed, for example, at 0° C. to 100° C. for 1 hour to 24 hours.

Regarding the reaction between a silyloxylated alkyl halide (14) and a compound of Formula (15), the reaction between a silyloxylated alkyl halide (14) and a compound of Formula (23), the reaction between a silyloxylated alkyl halide (14) and a compound of Formula (25), the reaction between a silyloxylated alkyl halide (14) and a compound of Formula (32), the reaction between a silyloxylated alkyl halide (14) and a compound of Formula (37), the reaction between a silyloxylated alkyl halide (14) and a compound of Formula (38), and the reaction between a silyloxylated alkyl halide (14) and a compound of Formula (44), synthesis can be performed by performing the reactions in the presence of a base.

Examples of the base that is used for the above-described reactions include organic bases such as TEA, DIPEA, DBU, DBN, DABCO, imidazole, N-methylimidazole, N,N-dimethylaniline, pyridine, 2,6-rutidine, DMAP, LDA, NaOAc, MeONa, MeOK, lithium hexamethyl disilazide (LHMDS), and sodium bis(trimethylsilyl)amide (NaHMDS); and inorganic bases such as $Na_2CO_3$, $NaHCO_3$, NaH, $K_2CO_3$, and $Cs_2CO_3$.

Examples of the solvent include hydrocarbons such as hexane and heptane; ethers such as diethyl ether, diisopropyl ether, CPME, tetrahydrofuran, and dioxane; nitriles such as acetonitrile; amides such as DMF, dimethylacetamide, and hexamethylphosphoramide; sulfoxides such as dimethyl sulfoxide; lactams such as N-methylpyrrolidone; halogenated hydrocarbons such as chloroform and dichloromethane; aromatic hydrocarbons such as toluene and xylene; and mixed solvents of these.

The reactions may be performed, for example, at 40° C. to 150° C. for 1 hour to 24 hours.

In order to obtain a compound of Formula (21) from a compound of Formula (20), a compound of Formula (22) from a compound of Formula (20), a compound of Formula (28) from a compound of Formula (26), a compound of Formula (31) from a compound of Formula (30), a compound of Formula (34) from a compound of Formula (33), a compound of Formula (36) from a compound of Formula (33), a compound of Formula (40) from a compound of Formula (39), and a compound of Formula (43) from a compound of Formula (42), means of reacting each of the compounds with organometallic reagent (18), (19), or (27) may be mentioned.

Examples of the organometallic reagent include Grignard reagent that can be produced from an aryl halide, and a lithium reagent. Examples of the solvent include ethers such as diethyl ether, diisopropyl ether, CPME, tetrahydrofuran, and dioxane; aromatic hydrocarbons such as toluene and xylene; and mixed solvents of these. It is preferable that the reaction is performed, for example, at −48° C. to 100° C. for 0.5 hours to 48 hours.

In order to obtain a compound of Formula (23) from a compound of Formula (22), a compound of Formula (32) from a compound of Formula (31), a compound of Formula (37) from a compound of Formula (36), and a compound of Formula (44) from a compound of Formula (43), means of reacting each of the compounds with a deprotecting agent may be mentioned.

Examples of the deprotecting agent include TBAF (tetrabutylammonium fluoride), a hydrogen fluoride pyridine complex, a hydrogen fluoride-triethylamine complex, and ammonium fluoride. Examples of the solvent include ethers such as diethyl ether, diisopropyl ether, CPME, tetrahydrofuran, and dioxane; aromatic hydrocarbons such as toluene and xylene; halogenated hydrocarbons such as chloroform and dichloromethane; and mixed solvents of these. It is preferable that the reaction is performed, for example, at 0° C. to 80° C. for 1 hour to 24 hours.

In order to obtain a compound of Formula (24) from a compound of Formula (21), a compound of Formula (29) from a compound of Formula (28), a compound of Formula (35) from a compound of Formula (34), and a compound of Formula (41) from a compound of Formula (40), for example, each of the compounds can be produced by reacting the raw material compound with a halogenating agent. Examples of the halogen atom in Formulas (24), (29), (35), and (41) include a chlorine atom and a bromine atom.

Examples of the halogenating agent include thionyl chloride-pyridine, acetyl chloride, $PCl_3$, NCS, HCl, acetyl bromide, $PBr_3$, NBS, and HBr.

Examples of the solvent include hydrocarbons such as hexane and heptane; ethers such as diethyl ether, diisopropyl ether, CPME, tetrahydrofuran, and dioxane; aromatic hydrocarbons such as toluene and xylene; halogenated hydrocarbons such as chloroform and dichloromethane; dimethylformamide (DMF); and mixed solvents of these. The reaction may be performed, for example, at 0° C. to 100° C. for 0.5 hours to 48 hours.

The trityl compound (1) of the present invention can be used as a protecting agent for a functional group such as a carboxy group, a hydroxy group, an amino group, an amide group, or a mercapto group. A compound having a carboxy group, a hydroxy group, an amino group, or a mercapto group protected with the trityl compound (1) of the present invention has a feature that the compound has superior liquidity and solubility in solvents. Therefore, a compound having a functional group protected using the trityl compound (1) of the present invention as a protecting agent becomes liquid and can be separated and purified by an operation such as liquid-liquid phase separation. Furthermore, a protecting group used in the compound of the present invention can be easily removed using an acid.

The compound that can be protected with the trityl compound (1) of the present invention may be any compound having a carboxy group, a hydroxy group, an amino group, an amide group, or a mercapto group, and examples include amino acids, peptides, saccharides, proteins, nucleotides, other various pharmaceutical compounds, agrochemical compounds, as well as various polymers and dendrimers.

The synthesis method for a peptide using the trityl compound (1) of the present invention as a protecting agent is, for example, a production method including the following steps (1) to (4).

(1) The trityl compound (1) of the present invention is condensed with a C-terminal carboxy group of an N-protected amino acid or an N-protected peptide in a soluble solvent, and thereby an N-protected, C-protected amino acid or an N-protected, C-protected peptide, in which the C-terminal is protected with the trityl compound (1) of the present invention, is obtained. Alternatively, the trityl compound (1) of the present invention is reacted with a C-terminal amide group of an N-protected amino acid or an N-protected peptide in a soluble solvent, and thereby an N-protected, C-protected amino acid or an N-protected, C-protected peptide, in which the C-terminal is protected with the trityl compound (1) of the present invention, is obtained.

(2) The protecting group of the N-terminal of the N-protected, C-protected amino acid or the N-protected, C-protected peptide thus obtained is removed, and thus a C-protected amino acid or a C-protected peptide is obtained.

(3) An N-protected amino acid or an N-protected peptide is condensed with the N-terminal of the C-protected amino acid or C-protected peptide thus obtained, and thereby an N-protected, C-protected peptide is obtained.

(4) The protecting group of the N-terminal and the protecting group of the C-terminal of the N-protected, C-protected peptide thus obtained are removed, and thereby a desired peptide is obtained.

EXAMPLES

Next, the present invention will be explained in detail byway of Examples; however, the present invention is not limited to these.

Example 1

Synthesis of TIPS2-4,4'-diClTrt-Cl

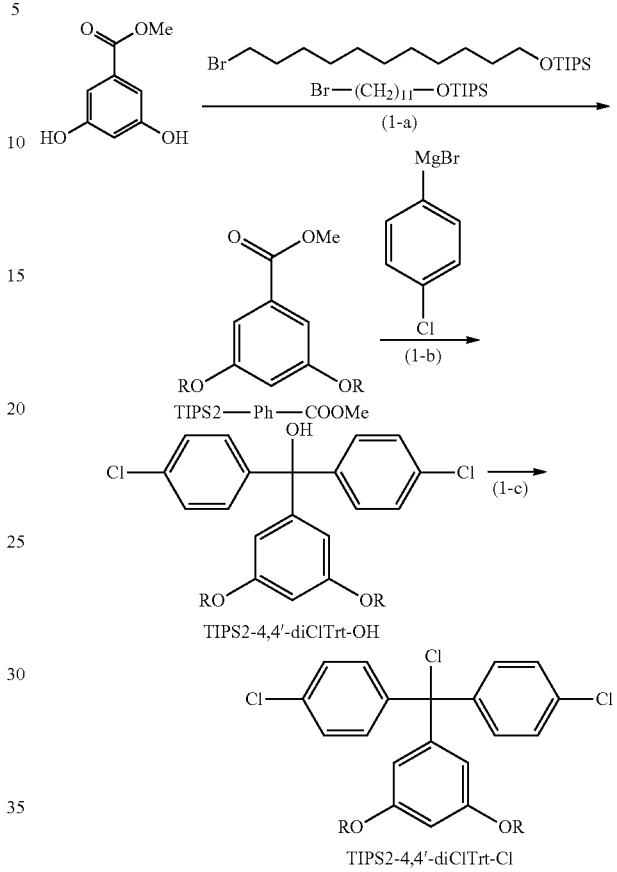

R = $(CH_2)_{11}$OTIPS (In the following description, Br—$(CH_2)_{11}$—OTIPS, TIPS2-Ph-COOMe, TIPS2-4,4'-diClTrt-OH, and TIPS2-4,4'-diClTrt-Cl represent the structures in the diagram.)

Example (1-a): TIPS2-Ph-COOMe 8.66 g (21.3 mmol) of Br—$(CH_2)_{11}$—OTIPS, 1.59 g (9.5 mmol) of methyl 3,5-dihydroxybenzoate, and 4.70 g (34.0 mmol) of potassium carbonate were suspended in 37.8 mL of DMF, and the suspension was heated to 85° C. and stirred for 3 hours. Subsequently, the temperature of the suspension was increased to 100° C., and the suspension was stirred for 3 hours. The reaction solution was filtered, and the filter cake was washed with 79 mL of heptane. The filtrate was partitioned, and 38 mL of heptane was added to a heptane layer thus obtained. The heptane layer was partitioned and washed with 38 mL of DMF. 38 mL of heptane was added to the heptane layer thus obtained, and the heptane layer was partitioned and washed once with 38 mL of 1 N hydrochloric acid, once with 38 mL of a 5% aqueous solution of sodium hydrogen carbonate, and once with 38 mL of water. 38 mL of heptane was added to the heptane layer, and the heptane layer was partitioned and washed two times with 38 mL of acetonitrile. The heptane layer was concentrated under reduced pressure, and a residue thus obtained was purified by silica gel column chromatography (heptane:ethyl acetate=200:1→0:100). Thus, 9.76 g of TIPS2-Ph-COOMe was obtained.

¹H-NMR (400 MHz, CDCl₃) δ1.04-1.08 (m, 42H), 1.23-1.39 (m, 24H), 1.44 (quin., 4H), 1.54 (quin., 4H), 1.77 (quin., 4H), 3.67 (t, 4H), 3.89 (s, 3H), 3.96 (t, 4H), 6.64 (t, 1H), 7.16 (d, 2H)
ESIMS MNa+ 843.6

Example (1-b): TIPS2-4,4'-diClTrt-OH 0.82 g (1.00 mmol) of TIPS2-Ph-COOMe was dissolved in 10.0 mL of THF, and 9.00 mL (9.00 mmol) of a 4-chloro phyenyl magnesium bromide diethyl ether solution was added thereto. The mixture was heated to 75° C. and stirred for 3 hours. The reaction solution was cooled to 5° C., and the reaction was stopped with 30 mL of 1 N hydrochloric acid. 80 mL of hexane was added thereto, and the mixture was partitioned and washed once with 45 mL of 1 N hydrochloric acid, once with 45 mL of a 5% aqueous solution of sodium hydrogen carbonate, and once with 45 mL of water. 20 mL of heptane was added to a heptane layer, and the heptane layer was partitioned and washed with 50 mL of acetonitrile. The partitioning and washing with heptane and acetonitrile as described above were performed once more. 30 mL of heptane was added to the heptane layer, and the heptane layer was partitioned and washed with 15 mL of DMF. 15 mL of heptane was added to the heptane layer, and the heptane layer was partitioned and washed with 15 mL of DMF. The partitioning and washing with heptane and acetonitrile described above were performed two more times, and the heptane layer was concentrated under reduced pressure. A residue thus obtained was purified by silica gel column chromatography (heptane:ethyl acetate=70:1→15:1), and thus 0.50 g of TIPS2-4,4'-diClTrt-OH was obtained.

¹H-NMR (400 MHz, CDCl₃) δ1.04-1.08 (m, 42H), 1.23-1.44 (m, 28H), 1.53 (quin., 4H), 1.70 (quin., 4H), 2.72 (s, 1H), 3.66 (t, 4H), 3.84 (t, 4H), 6.32 (d, 2H), 6.37 (t, 1H), 7.19-7.29 (m, 8H)

¹³C-NMR (100 MHz, CDCl₃) δ12.2 (6C), 18.2 (12C), 26.0 (2C), 26.2 (2C), 29.3-29.8 (12C), 33.2 (2C), 63.7 (2C), 68.3 (2C), 81.5, 100.2, 106.9 (2C), 128.3 (4C), 129.4 (4C), 133.5 (2C), 144.9 (2C), 148.4, 160.2 (2C) ESIMS MNa+ 1035.9

Example (1-c): TIPS2-4,4'-diClTrt-Cl 30 mg (0.03 mmol) of TIPS2-4,4'-diClTrt-OH was dissolved in 0.49 mL of chloroform, and 97 µL (1.37 mmol) of acetyl chloride was added thereto. The mixture was heated to 45° C. and stirred for 1 hour and 30 minutes. Furthermore, 97 µL (1.37 mmol) of acetyl chloride was added thereto, and the mixture was stirred for 15 hours at 45° C. 5.0 mL of hexane was added to the reaction solution, and the mixture was partitioned and washed with 3.0 mL of acetonitrile. 2.0 mL of heptane was added to a heptane layer, and the heptane layer was partitioned and washed with 3.0 mL of acetonitrile. The partitioning and washing using heptane and acetonitrile described above were performed one more time, and the heptane layer was concentrated under reduced pressure. Thus, 21 mg of TIPS2-4,4'-diClTrt-Cl was obtained.

¹H-NMR (400 MHz, CDCl₃) δ1.04-1.08 (m, 42H), 1.23-1.44 (m, 28H), 1.53 (quin., 4H), 1.71 (quin., 4H), 3.67 (t, 4H), 3.85 (t, 4H), 6.32 (d, 2H), 6.40 (t, 1H), 7.15-7.30 (m, 8H)

¹³C-NMR (100 MHz, CDCl₃) δ12.2 (6C), 18.2 (12C), 26.0 (2C), 26.2 (2C), 29.3-29.8 (12C), 33.2 (2C), 63.7 (2C), 68.3 (2C), 80.1, 100.7, 108.9 (2C), 128.1 (4C), 131.1 (4C), 134.2 (2C), 143.5 (2C), 146.5, 159.9 (2C)

Example 2

Synthesis of TIPS6-2-ClTrt-OH

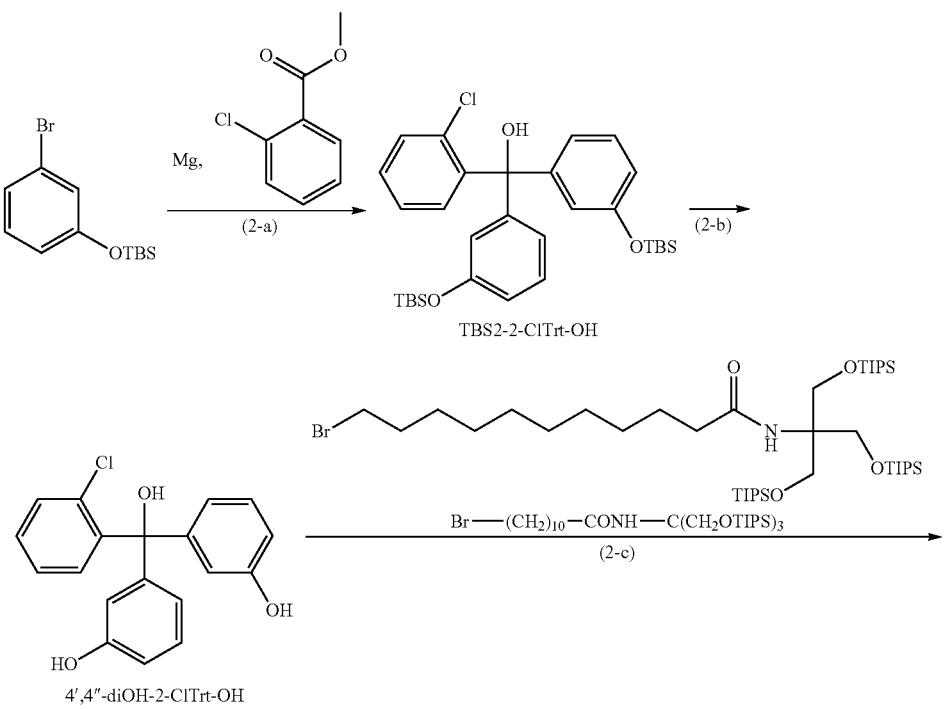

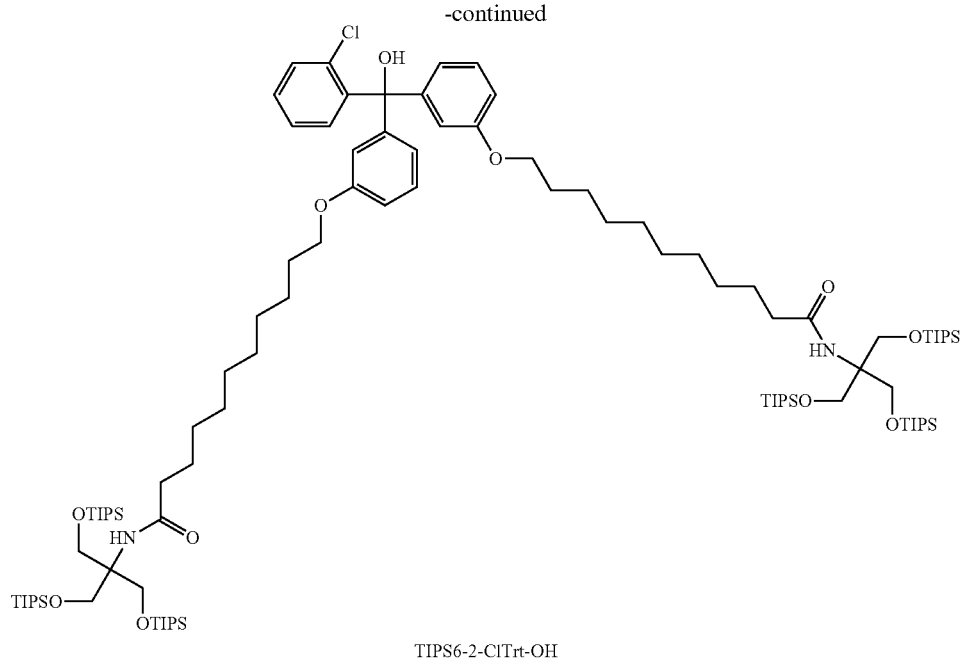

TIPS6-2-ClTrt-OH (In the following description, TBS2-2-ClTrt-OH, 4',4"-diOH-2-ClTrt-OH, Br—(CH$_2$)10-CONH—C(CH$_2$OTIPS)$_3$, and TIPS6-2-ClTrt-OH represent the structures in the diagram).

Example (2-a): TBS2-2-ClTrt-OH 4.48 g (15.6 mmol) of 1-bromo-3-[[(1,1-dimethylethyl)dimethylsilyl]oxy]benzene was dissolved in 31.2 mL of anhydrous THF, and 455 mg (18.7 mmol) of magnesium was added thereto. The interior of the reaction container was purged with nitrogen, subsequently 7 µL (0.08 mmol) of 1,2-dibromoethane was added thereto, and the mixture was heated to reflux for 2 hours. The reaction solution was cooled to 50° C., 1.00 g (5.9 mmol) of methyl 2-chlorobenzoate dissolved in 7.8 mL of anhydrous THF was added thereto, and the mixture was heated to reflux for 50 minutes. The reaction solution was cooled to 5° C., the reaction was stopped with 79 mL of a saturated aqueous solution of ammonium chloride, 224 mL of heptane was added thereto, and the mixture was partitioned and washed. An organic layer thus obtained was partitioned and washed once with 79 mL of a saturated aqueous solution of ammonium chloride and once with 116 mL of a 5% aqueous solution of sodium hydrogen carbonate. The organic layer was concentrated under reduced pressure, and thereby a mixture including TBS2-2-ClTrt-OH was obtained.

Example (2-b): 4',4"-diOH-2-ClTrt-OH

The mixture obtained in the previous process was dissolved in 17.7 mL of THF, and 13.3 mL (13.3 mmol) of a 1.0 M THF solution of tetrabutylammonium fluoride was added thereto. The mixture was stirred for 20 minutes at room temperature. The reaction solution was cooled to 5° C., the reaction was stopped with 147 mL of a saturated aqueous solution of ammonium chloride, 147 mL of ethyl acetate was added thereto, and the mixture was partitioned and washed. An organic layer thus obtained was partitioned and washed once with 147 mL of a saturated aqueous solution of ammonium chloride and once with 147 mL of a 5% aqueous solution of sodium hydrogen carbonate. The organic layer was concentrated under reduced pressure, and a residue thus obtained was purified by silica gel column chromatography (heptane:ethyl acetate=10:1→4:1→2:1→1:1), and thus 0.45 g of 4',4"-diOH-2-ClTrt-OH was obtained.

$^1$H-NMR (400 MHz, DMSO-d$_6$) δ6.21 (s, 1H), 6.60-6.69 (m, 6H), 6.99 (dd, 1H), 7.08 (t, 2H), 77.29 (td, 1H), 7.38 (dd, 1H), 9.26 (s, 2H)

$^{13}$C-NMR (100 MHz, DMSO-d$_6$) δ80.7, 113.6 (2C), 114.9 (2C), 118.5 (2C), 126.1, 128.4 (2C), 128.9, 130.6, 131.3, 133.7, 144.3, 147.8 (2C), 156.7 (2C)

ESIMS MH+ 327.1

Example (2-c): TIPS6-2-ClTrt-OH 0.91 g (1.09 mmol) of Br—(CH$_2$)$_{10}$—CONH—C(CH$_2$OTIPS)$_3$, 0.14 g (0.43 mmol) of 4',4"-diOH-2-ClTrt-OH, and 0.19 g (1.37 mmol) of potassium carbonate were suspended in 2.8 mL of DMF, and the suspension was heated to 120° C. and stirred for 2 hours and 15 minutes. Furthermore, 0.16 g (0.19 mmol) of Br—(CH$_2$)$_{10}$—CONH—C(CH$_2$OTIPS)$_3$ was added thereto, and the mixture was stirred for 2 hours and 30 minutes at 120° C. The mixture was cooled to room temperature, and the reaction solution was filtered and washed with 6.0 mL of heptane. The filtrate was partitioned, 2.8 mL of heptane was added to a heptane layer thus obtained, and the heptane layer was partitioned and washed with 2.8 mL of DMF. 2.8 mL of heptane was added to the heptane layer thus obtained, and the heptane layer was partitioned and washed with 2.8 mL of water. 2.8 mL of heptane was added to the heptane layer thus obtained, and the heptane layer was partitioned and washed two times with 2.8 mL of acetonitrile. The heptane layer was concentrated under reduced pressure, and a residue thus obtained was purified by silica gel column chromatography (heptane:ethyl acetate=50:1→15:1). Thus, 0.31 g of TIPS6-2-ClTrt-OH was obtained.

$^1$H-NMR (400 MHz, Benzene-d$_6$) δ1.14-1.18 (m, 126H), 1.18-1.36 (m, 24H), 1.56 (quin., 4H), 1.74 (quin., 4H), 2.19 (t, 4H), 3.59-3.70 (m, 4H), 4.42 (s, 12H), 4.58 (s, 1H), 5.91 (s, 2H), 6.65-6.75 (m, 2H), 6.84 (dd, 2H), 6.96-7.02 (m, 3H), 7.05-7.12 (m, 3H), 7.43 (t, 2H)

$^{13}$C-NMR (100 MHz, Benzene-d$_6$) δ12.7 (18C), 18.7 (36C), 26.6 (2C), 26.8 (2C), 29.8-30.3 (12C), 38.3 (2C), 62.2 (6C), 62.8 (2C), 68.2 (2C), 83.3, 114.3 (2C), 114.7 (2C), 121.1 (2C), 126.9, 129.5 (3C), 131.8, 132.3, 134.1, 144.9, 148.3 (2C), 160.2 (2C), 172.4 (2C)

ESIMS MNa+ 1860.2

Example 3

Verification of Solubility Enhancing Performance for Peptide Compound

The solubility of a compound protected with the trityl protecting agent according to the present invention was measured.

Peptide used as a model: H-Phe-Leu-Gly-OH

H-Phe-Leu-Gly-OH and H-Phe-Leu-Gly-O-(TIPS2-4,4'-diClTrt) were synthesized, and the respective compounds were dissolved to saturation in CPME (cyclopentyl methyl ether) at 25° C. Thus, the solubilities were measured.

As the result, compared to a case in which H-Phe-Leu-Gly-OH without a trityl protecting agent bonded thereto dissolved in CPME somehow only to a concentration of 0.9 mM, in a case in which TIPS2-4,4'-diClTrt-Cl was bonded, the solubility was increased to about 1,100 times or more at a concentration of 1,030 mM or higher. From these results, it was confirmed that by derivatizing a peptide using a trityl protecting agent, the solubility of the peptide is markedly increased. Meanwhile, H-Phe-Leu-Gly-OH and H-Phe-Leu-Gly-O-(TIPS2-4,4'-diClTrt) were synthesized as follows. Furthermore, they have the following structures.

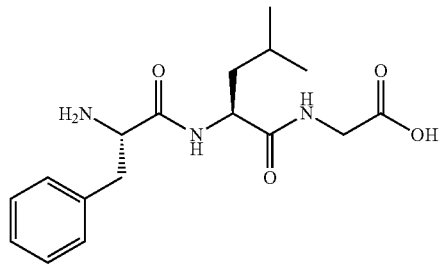

H-Phe-Leu-Gly-OH

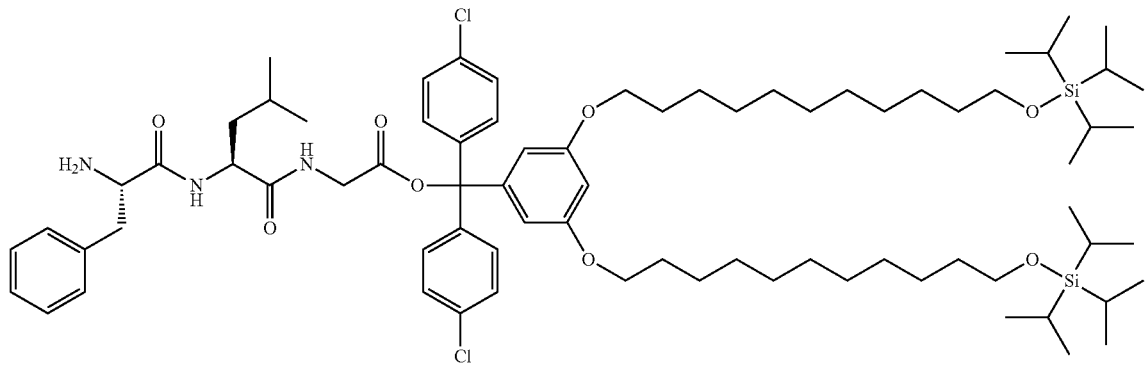

H-Phe-Leu-Gly-O-(TIPS2-4,4'-diClTrt)

Example (3-a)

Synthesis of H-Phe-Leu-Gly-O-(TIPS2-4,4'-diClTrt)

10.18 g (9.86 mmol) of TIPS2-4,4'-diClTrt-Cl was dissolved in 10.2 mL of dichloromethane, and a solution obtained by dissolving 8.59 mL (49.3 mmol) of DIPEA and 5.86 g (19.7 mmol) of Fmoc-Gly-OH in 86.5 mL of dichloromethane was added to the solution. 5.1 mL of dichloromethane was added thereto, and the mixture was stirred for 1 hour and 30 minutes at room temperature. The solution was concentrated under reduced pressure, a residue thus obtained was dissolved in 407 mL of heptane, and the solution was partitioned and washed three times with 407 mL of acetonitrile. A heptane layer was concentrated under reduced pressure, and thus a mixture including Fmoc-Gly-O-(TIPS2-4,4'-diClTrt) was obtained. Meanwhile, Fmoc-Gly-O-(TIPS2-4,4'-diClTrt) has the following structure.

with 500 mL of acetonitrile. The heptane layer was concentrated under reduced pressure, 100 mL of acetonitrile was added to a residue thus obtained, and the mixture was sufficiently stirred. Subsequently, the supernatant was removed by decantation, and thereby an oily material was obtained. This washing with acetonitrile and decantation was performed once more, and an oily material was obtained and dried under reduced pressure. The oily material thus obtained was subjected to crude purification by silica gel column chromatography (heptane:ethyl acetate:triethylamine=25:1:1.3→0:20:1), and thus 6.16 g of a mixture including H-Gly-O-(TIPS2-4,4'-diClTrt) was obtained. Meanwhile, H-Gly-O-(TIPS2-4,4'-diClTrt) has the following structure.

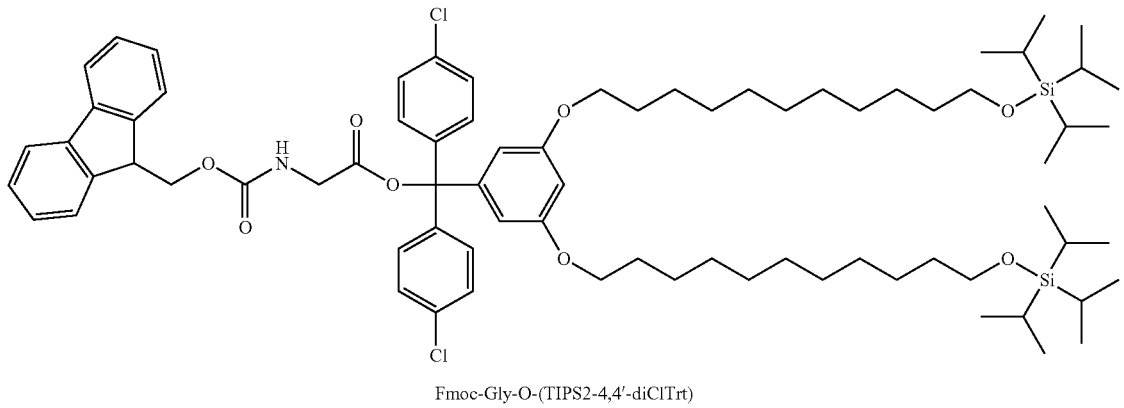

Fmoc-Gly-O-(TIPS2-4,4'-diClTrt)

The mixture thus obtained was dissolved in 91.9 mL of THF, and 2.75 mL (18.4 mmol) of DBU was added thereto. The mixture was cooled to 5° C. and stirred for 30 minutes. After the disappearance of Fmoc-Gly-O-(TIPS2-4,4'-diClTrt) was confirmed, 4.37 mL (17.5 mmol) of 4 M CPME/

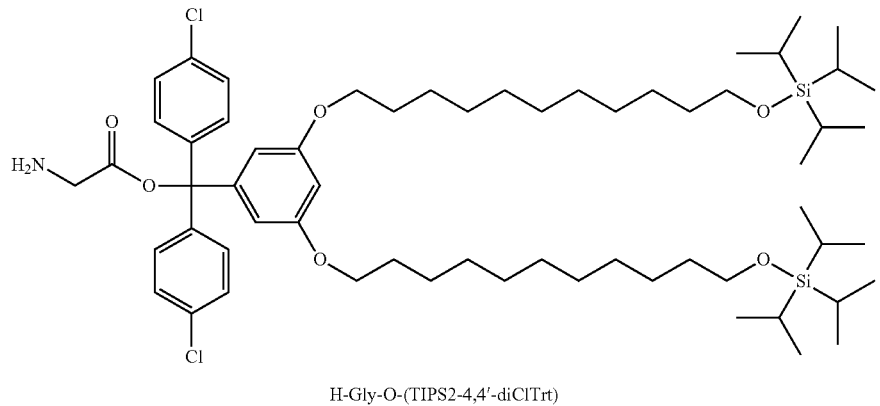

H-Gly-O-(TIPS2-4,4'-diClTrt)

HCl was added dropwise thereto, and the solution was concentrated under reduced pressure. A residue thus obtained was dissolved in 500 mL of heptane, and the solution was partitioned and washed two times with 500 mL of acetonitrile. 10 mL of CPME was added to a heptane layer thus obtained, and the mixture was partitioned and washed 6.16 g of the mixture thus obtained was dissolved in 53.7 mL of CPME, and 23.0 mL of DMF, 4.01 mL (23.0 mmol) of DIPEA, 3.05 g (8.62 mmol) of Fmol-Leu-OH, 1.23 g (8.62 mmol) of ethyl (hydroxyimino)cyanoacetate (Oxyma), and 3.69 g (8.62 mmol) of (1-cyano-2-ethoxy-2-oxoethyl-ideneaminoooxy)dimethylamino-morpholinocarbenium hexafluorophosphate (COMU) were added to the solution.

The mixture was stirred for 50 minutes at room temperature. After the disappearance of H-Gly-O-(TIPS2-4,4'-diClTrt) was confirmed, 342 μL (3.45 mmol) of 2-(2-aminoethoxy)ethanol was added thereto, and the mixture was stirred for 15 minutes. To the reaction solution, 12.29 g (69.0 mmol) of sodium 3-mercapto-1-propanesulfonate dissolved in 57.5 mL of DMSO was added, and the mixture was cooled to 5° C. Subsequently, 5.8 mL of DMSO and 6.88 mL (46.0 mmol) of DBU were added thereto, and the mixture was stirred for 30 minutes. After the disappearance of Fmoc-Leu-Gly-O-(TIPS2-4,4'-diClTrt) was confirmed, 12.1 mL (48.3 mmol) of 4 M CPME/HCl was added dropwise thereto, and the temperature was raised to room temperature. 3.1 mL of CPME, 186 mL of 20% brine, and 159 mL of a 10% aqueous solution of sodium carbonate were added to the mixture, and the mixture was partitioned and washed. To an organic phase thus obtained, 1.9 mL of DMSO, 1.9 mL of DMF, and 69 mL of a 50% aqueous solution of dipotassium hydrogen phosphate were added, and the mixture was partitioned and washed. Thus, a mixed liquid including H-Leu-Gly-O-(TIPS2-4,4'-diClTrt) was obtained.

Meanwhile, Fmoc-Leu-Gly-O-(TIPS2-4,4'-diClTrt) and H-Leu-Gly-O-(TIPS2-4,4'-diClTrt) have the following structures.

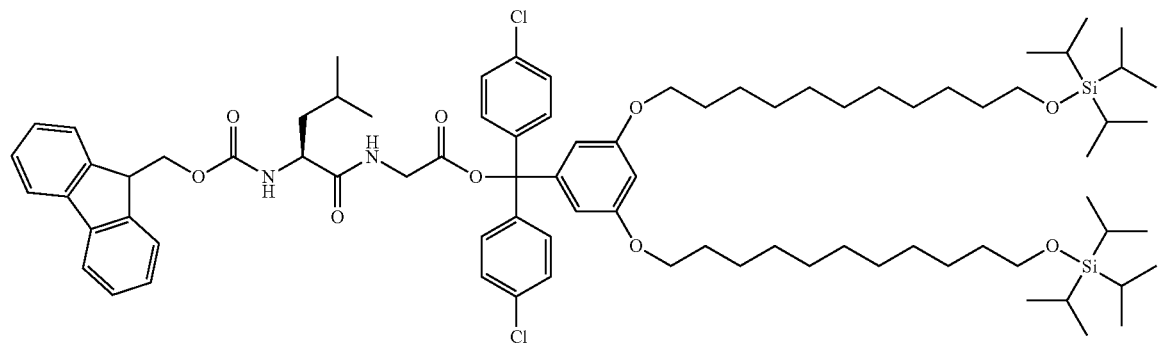

Fmoc-Leu-Gly-O-(TIPS2-4,4'-diClTrt)

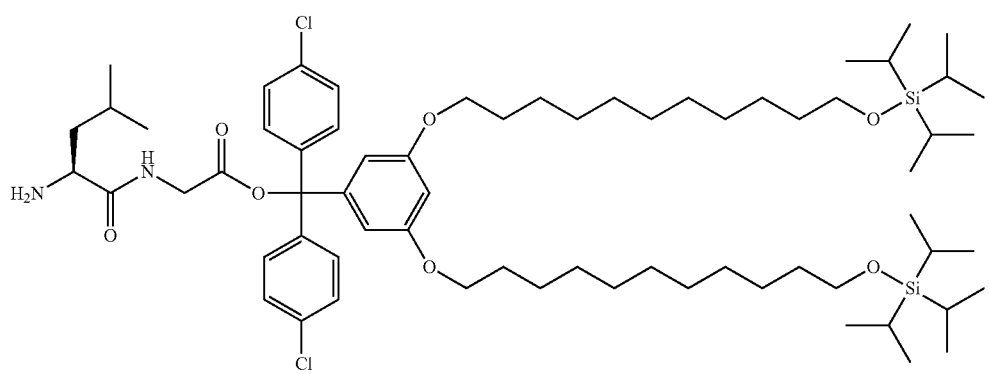

H-Leu-Gly-O-(TIPS2-4,4'-diClTrt)

To the mixed liquid thus obtained, 2.0 mL of CPME, 31.7 mL of DMF, 4.01 mL (23.0 mmol) of DIPEA, 3.34 g (8.62 mmol) of Fmoc-Phe-OH, 1.23 g (8.62 mmol) of Oxyma, and 3.69 g (8.62 mmol) of COMU were added, and the mixture was stirred for 40 minutes at room temperature. After the disappearance of H-Leu-Gly-O-(TIPS2-4,4'-diClTrt) was confirmed, the solution was concentrated under reduced pressure, and a residue thus obtained was dissolved in 204 mL of heptane. The solution was partitioned and washed four times with 102 mL of acetonitrile. A heptane layer was concentrated under reduced pressure, and a residue thus obtained was dried under reduced pressure. Thus, 7.37 g of Fmoc-Phe-Leu-Gly-O-(TIPS2-4,4'-diClTrt) was obtained.

ESIMS MNa+ 1574.7

Meanwhile, Fmoc-Phe-Leu-Gly-O-(TIPS2-4,4'-diClTrt) has the following structure.

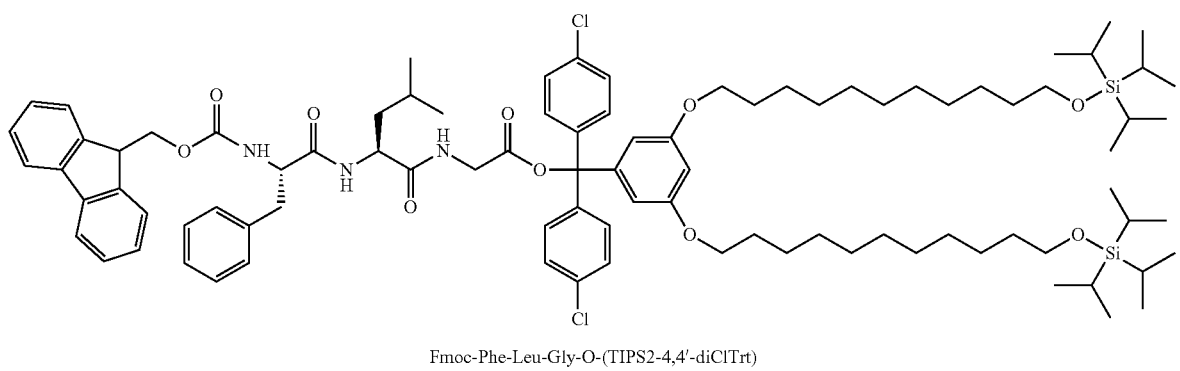 [SMILES: CC(C)C[C@H](NC(=O)[C@H](Cc1ccccc1)NC(=O)OCC1c2ccccc2-c2ccccc21)C(=O)NCC(=O)OC(c1ccc(Cl)cc1)(c1ccc(Cl)cc1)c1cc(OCCCCCCCCCCCO[Si](C(C)C)(C(C)C)C(C)C)cc(OCCCCCCCCCCCO[Si](C(C)C)(C(C)C)C(C)C)c1]

Fmoc-Phe-Leu-Gly-O-(TIPS2-4,4'-diClTrt)

4.43 g (2.85 mmol) of Fmoc-Phe-Leu-Gly-O-(TIPS2-4,4'-diClTrt) was dissolved in 28.5 mL of THF, 0.85 mL (5.70 mmol) of DBU was added to the solution, and the mixture was cooled to 5° C. and stirred for 25 minutes. After the disappearance of Fmoc-Phe-Leu-Gly-O-(TIPS2-4,4'-diCl-Trt) was confirmed, 1.35 mL (5.42 mmol) of 4 M CPME/HCl was added dropwise thereto, and the solution was concentrated under reduced pressure. A residue thus obtained was dissolved in 200 mL of heptane, and the solution was partitioned and washed with 200 mL of acetonitrile. A heptane layer was concentrated under reduced pressure, and 22 mL of acetonitrile was added to a residue thus obtained. The mixture was sufficiently stirred, and then the supernatant was removed by decantation. Thus, an oily material was obtained. This washing with acetonitrile and decantation was performed five more times, and an oily material was obtained. The oily material was dissolved in THF, the solution was concentrated under reduced pressure, and a residue thus obtained was dried under reduced pressure. Thus, 3.04 g of H-Phe-Leu-Gly-O-(TIPS2-4,4'-diCl-Trt) was obtained.

ESIMS MNa+ 1353.0

Example (3-b)

Synthesis of H-Phe-Leu-Gly-OH 102 mg (0.077 mmol) of H-Phe-Leu-Gly-O-(TIPS2-4,4'-diClTrt) was dissolved in 1.52 mL of dichloromethane, 15 μL (0.20 mmol) of trifluoroacetic acid was added to the solution, and the mixture was stirred for 45 minutes at room temperature. After the disappearance of H-Phe-Leu-Gly-O-(TIPS2-4,4'-diClTrt) was confirmed, the solution was concentrated under reduced pressure, and 10 mL of diisopropyl ether was added dropwise to the residue. The mixture was cooled to 5° C. and sufficiently stirred, subsequently the mixture was centrifuged for 5 minutes at 3,000 rpm at 5° C., and the supernatant was removed by decantation. Thereby, a precipitated was obtained. This slurry washing using diisopropyl ether, centrifugation, and decantation were performed three more times, and a precipitate was obtained. The precipitate was dried under reduced pressure, and 24 mg of H-Phe-Leu-Gly-OH was obtained.

ESIMS MH+ 336.1

From the results described above, it was understood that in a compound having a functional group protected using the trityl protecting agent of the present invention, the solubility in an organic solvent is increased to a large extent.

The invention claimed is:

1. A trityl compound of the following formula (1):

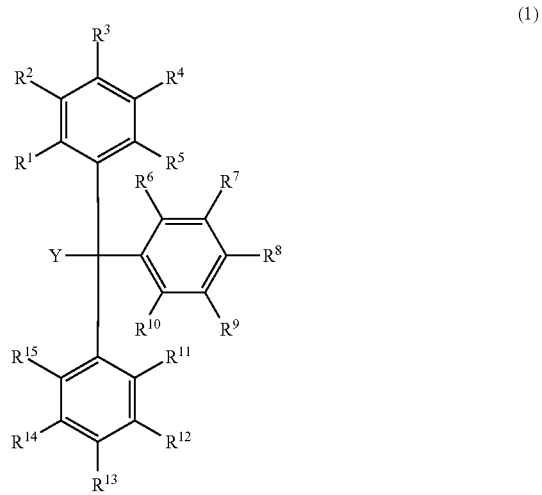

wherein Y represents a hydroxy group or a halogen atom; at least one of $R^1$ to $R^{15}$ represents a group represented by the following formula (2):

the remaining $R^1$ to $R^{15}$ each independently representing a hydrogen atom, a halogen atom, an alkyl group having 1 to 4 carbon atoms, or an alkoxy group having 1 to 4 carbon atoms;

$R^{16}$ represents a linear or branched alkylene group having 6 to 16 carbon atoms;

X represents O or $CONR^{17}$ wherein $R^{17}$ represents a hydrogen atom or an alkyl group having 1 to 4 carbon atoms; and A represents a group represented by the following formula (3), (4), (5), (6), (7), (8), (9), (10), (11), (12), or (13):

(4)
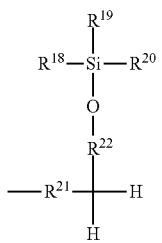

(5)
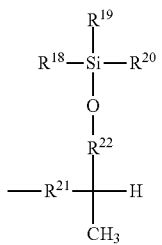

(6)
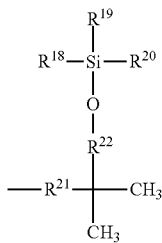

(7)
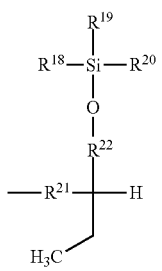

(8)
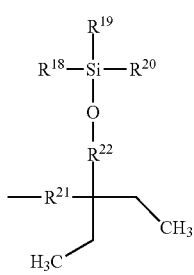

(9)
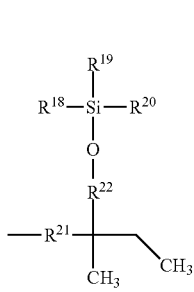

(10)
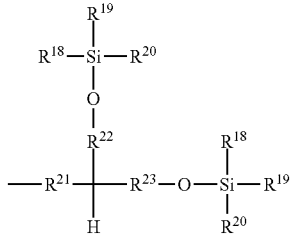

(11)
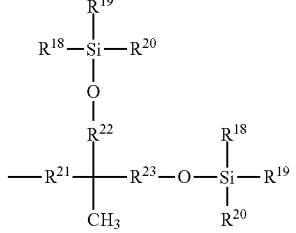

(12)
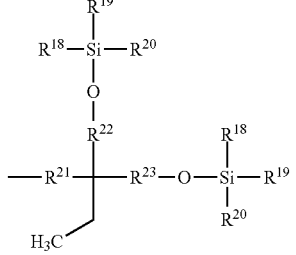

(13)
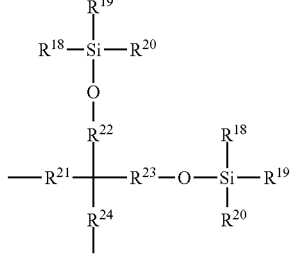

wherein $R^{18}$, $R^{19}$, and $R^{20}$, which may be identical or different, each represent a linear or branched alkyl group having 1 to 6 carbon atoms or an aryl group which may have a substituent; $R^{21}$ represents a single bond or a linear or branched alkylene group having 1 to 3 carbon atoms; and $R^{22}$, $R^{23}$, and $R^{24}$ each represent a linear or branched alkylene group having 1 to 3 carbon atoms, wherein the group represented by formula (2) is not a 2-t-butyldimethylsilyloxyethoxy group or a 3-t-butyldimethylsilyloxypropoxy group.

2. The trityl compound according to claim 1, wherein Y represents a hydroxy group, a chlorine atom, or a bromine atom.

3. The trityl compound according to claim 1, wherein at least one of $R^1$ to $R^{15}$ represents a group represented by the formula (2), the remaining $R^1$ to $R^{15}$ each independently representing a hydrogen atom or a halogen atom.

4. The trityl compound according to claim 1, wherein $R^{16}$ represents a linear or branched alkylene group having 2 to 16 carbon atoms.

5. The trityl compound according to claim 1, wherein A represents a group represented by formula (4), (5), (6), (7), (8), (9), (10), (11) (12), or (13), $R^{21}$ represents a single bond or a methylene group, and $R^{22}$, $R^{23}$, and $R^{24}$ each represent a methylene group.

6. A protecting agent for a carboxy group, a hydroxy group, an amino group, an amide group, or a mercapto group, the protecting agent comprising the trityl compound according to claim 1.

7. The trityl compound according to claim 1,
wherein Y represents a hydroxy group, a chlorine atom, or a bromine atom, and
wherein at least one of $R^1$ to $R^{15}$ represents a group represented by the formular (2), the remaining $R^1$ to $R^{15}$ each independently representing a hydrogen atom or a halogen atom.

8. A trityl compound of the following formula (1):

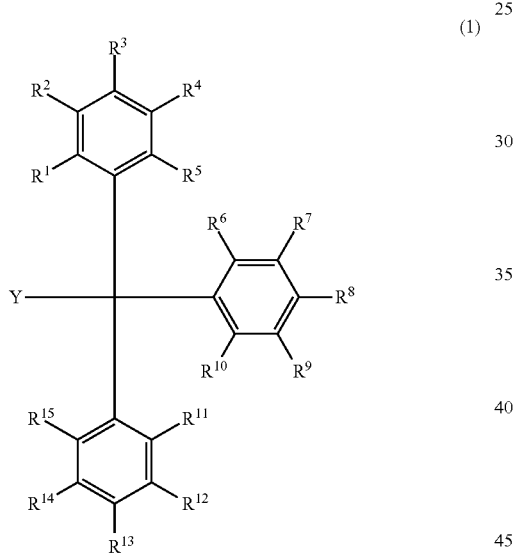

(1)

wherein Y represents a hydroxy group or halogen atom; $R^3$ and $R^{13}$ each independently represent a hydrogen atom or a halogen atom, and at least one of $R^1$, $R^2$, $R^4$ to $R^{12}$, $R^{14}$ and $R^{15}$ represents a group represented by the following formula (2):

—O—$R^{16}$—X-A    (2)

the remaining $R^1$, $R^2$, $R^4$ to $R^{12}$, $R^{14}$ and $R^{15}$ each independently representing a hydrogen atom, a halogen atom, an alkyl group having 1 to 4 carbon atoms, or an alkoxy group having 1 to 4 carbon atoms;
$R^{16}$ represents a linear or branched alkylene group having 1 to 16 carbon atoms;
X represents O or $CONR^{17}$ wherein $R^{17}$ represents a hydrogen atom or an alkyl group having 1 to 4 carbon atoms; and
A represents a group represented by the following formula (3), (4), (5), (6), (7), (8), (9), (10), (11), (12), or (13):

(3)

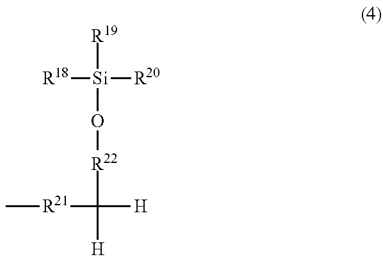

(4)

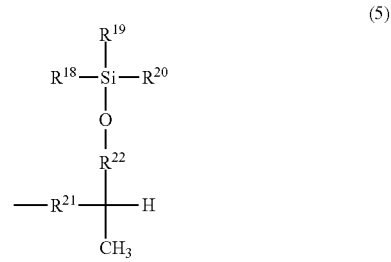

(5)

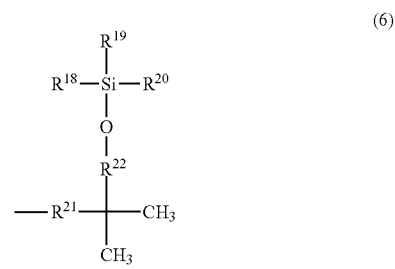

(6)

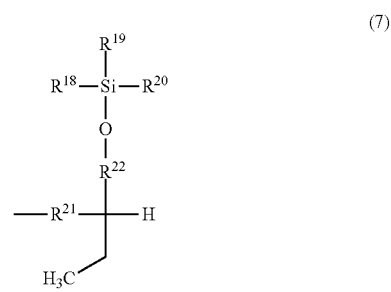

(7)

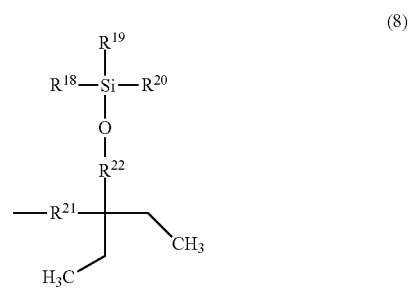

(8)

-continued

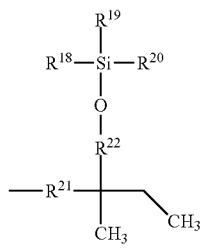
(9)

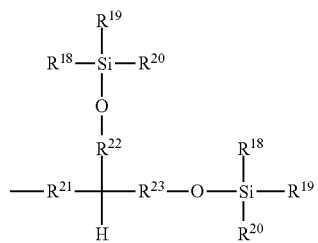
(10)

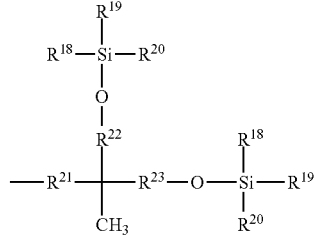
(11)

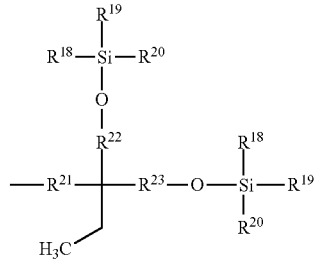
(12)

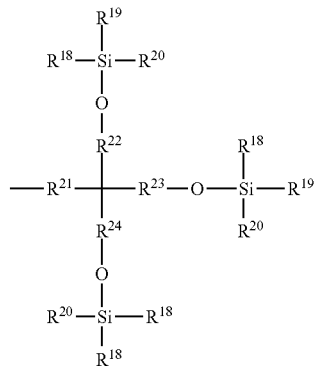
(13)

wherein $R^{18}$, $R^{19}$, and $R^{20}$, which may be identical or different, each represent a linear or branched alkyl group having 1 to 6 carbon atoms or an aryl group which may have a substituent; $R^{21}$ represents a single bond or a linear or branched alkylene group having 1 to 3 carbon atoms; and $R^{22}$, $R^{23}$, and $R^{24}$ each represent a linear or branched alkylene group having 1 to 3 carbon atoms.

9. The trityl compound according to claim 8, wherein Y represents a hydroxy group, a chlorine atom, or a bromine atom.

10. The trityl compound according to claim 8, wwherein at least one of $R^1$, $R^2$, $R^4$ to $R^{12}$, $R^{14}$ and $R^{15}$ represents a group represented by the formula (2), the remaining $R^1$, $R^2$, $R^4$ to $R^{12}$, $R^{14}$ and $R^{15}$ each independently representing a hydrogen atom or a halogen atom.

11. The trityl compound according to claim 8, wherein $R^{16}$ represents a linear or branched alkylene group having 2 to 16 carbon atoms.

12. The trityl compound according to claim 8, wherein A represents a group represented by forumla (4), (5), (6), (7), (8), (9), (10), (11), (12), or (13), $R^{21}$ represents a single bond or a methylene group, and $R^{22}$, $R^{23}$, and $R^{24}$ each represent a methylene group.

13. A protecting agent for a carboxy group, a hydroxy group, an amino group, an amide group, or a mercapto group, the protecting agent comprising the trityl compound according to claim 8.

14. A method, comprising protecting a carboxy group, a hydroxy group, an amino group, an amide group, or a mercapto group of a compound, with a trityl compound of the following formular (1):

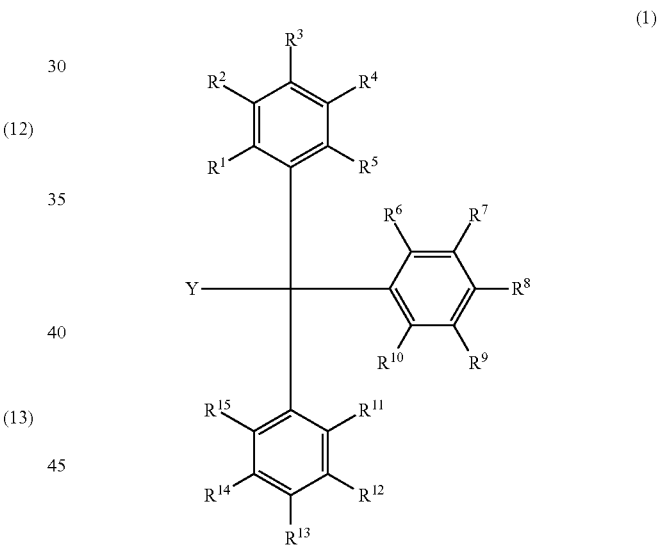
(1)

wherein Y represents a hydroxy group or a halogen atom; at least one of $R^1$ to $R^{15}$ represents a group represented by the following formula (2):

$$—O—R^{16}—X\text{-}A \qquad (2)$$

the remaining $R^1$ to $R^{15}$ each independently representing a hydrogen atom, a halogen atom, an alkyl group having 1 to 4 carbon atoms, or an alkoxy group having 1 to 4 carbon atoms;

$R^{16}$ represents a linear or branched alkylene group having 1 to 16 carbon atoms;

X represents O or $CONR^{17}$ wherein $R^{17}$ represents a hydrogen atom or an alkyl group having 1 to 4 carbon atoms; and A represents a group represented by the following formula (3), (4), (5), (6), (7), (8), (9), (10), (11), (12), or (13):

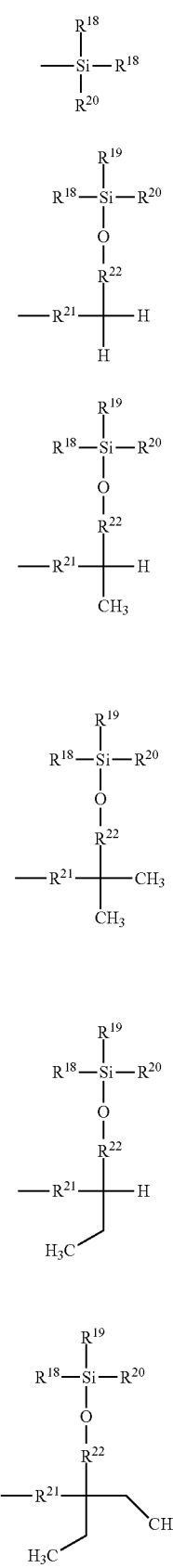

wherein $R^{18}$, $R^{19}$, and $R^{20}$, which may be identical or different, each represent a linear or branched alkyl group having 1 to 6 carbon atoms or an aryl group which may have a substituent; $R^{21}$ represents a single bond or a linear or branched alkylene group having 1 to 3 carbon atoms; and $R^{22}$, $R^{23}$, and $R^{24}$ each represent a linear or branched alkylene group having 1 to 3 carbon atoms, as a protecting agent.

15. The method according to claim 14, wherein the compound is an amino acid or a peptide.

16. The method according to claim 14, wherein Y represents a hydroxy group, a chlorine atom, or a bromine atom.

17. The method according to claim 14, wherein at least one of $R^1$ to $R^{15}$ represents a group represented by the Formula (2), the remaining $R^1$ to $R^{15}$ each independently representing a hydrogen atom or a halogen atom.

18. The method according to claim 14, wherein $R^{16}$ represents a linear or branched alkylene group having 2 to 16 carbon atoms.

19. The method according to claim 14, wherein $R^{16}$ represents a linear or branched alkylene group having 6 to 16 carbon atoms.

20. The method according to claim 14, wherein A represents a group represented by formula (4), (5), (6), (7), (8), (9), (10), (11), (12), or (13), $R^{21}$ represents a single bond or a methylene group, and $R^{22}$, $R^{23}$, and $R^{24}$ each represent a methylene group.

\* \* \* \* \*